(12) United States Patent
Saito

(10) Patent No.: US 12,455,431 B2
(45) Date of Patent: Oct. 28, 2025

(54) OPTICAL SYSTEM AND IMAGE CAPTURING APPARATUS INCLUDING THE SAME

(71) Applicant: CANON KABUSHIKI KAISHA, Tokyo (JP)

(72) Inventor: Takahiro Saito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 17/932,626

(22) Filed: Sep. 15, 2022

(65) Prior Publication Data

US 2023/0097746 A1  Mar. 30, 2023

(30) Foreign Application Priority Data

Sep. 22, 2021  (JP) ................. 2021-154433

(51) Int. Cl.
*G02B 9/12* (2006.01)
*G02B 5/00* (2006.01)
*H04N 25/00* (2023.01)

(52) U.S. Cl.
CPC ............ *G02B 9/12* (2013.01); *G02B 5/005* (2013.01); *H04N 25/00* (2023.01)

(58) Field of Classification Search
CPC ... G02B 9/12; G02B 9/14; G02B 9/18; G02B 9/24; G02B 9/30; G02B 9/34; G02B 9/60; G02B 9/62; G02B 9/64; G02B 13/00; G02B 13/0045; G02B 13/0055; G02B 13/006; G02B 13/04
USPC ....... 359/784–788, 790, 781, 782, 771, 772, 359/773
See application file for complete search history.

(56) References Cited

U.S. PATENT DOCUMENTS

| | | | |
|---|---|---|---|
| 2016/0291290 A1* | 10/2016 | Omori | G02B 9/12 |
| 2016/0291291 A1* | 10/2016 | Omori | G02B 27/0025 |
| 2016/0313543 A1* | 10/2016 | Nakahara | G02B 9/10 |

FOREIGN PATENT DOCUMENTS

| | | | |
|---|---|---|---|
| JP | 2009199092 A | | 9/2009 |
| JP | 2010176096 A | | 8/2010 |
| JP | 2013037080 A | | 2/2013 |
| JP | 2014089351 A | | 5/2014 |
| JP | 2015163928 A | | 9/2015 |
| JP | 2016188968 A | | 11/2016 |
| JP | 2016206491 A | | 12/2016 |
| JP | 2016206492 A | | 12/2016 |

(Continued)

OTHER PUBLICATIONS

Gross et al. "Handbook of Optical Systems vol. 3: Aberration Theory and Correction of Optical Systems" Weinheim Germany, Wiley-VCH Verlag GmbH & Co. KGaA, pp. 377-379 (Year: 2007). (Year: 2007).*

*Primary Examiner* — Marin Pichler
(74) *Attorney, Agent, or Firm* — Canon U.S.A., Inc. IP Division

(57) ABSTRACT

An optical system includes a front lens unit with positive refractive power, an intermediate lens unit, and a rear lens unit in order from an object side to an image side. The intermediate lens unit moves to change an interval between the front lens unit and the intermediate lens unit and an interval between the intermediate lens unit and the rear lens unit in focusing from infinity to a close range. The focal length of the front lens unit and the effective diameter of a lens surface closest to the image side in the rear lens unit satisfy a predetermined inequality.

17 Claims, 15 Drawing Sheets

(56) References Cited

FOREIGN PATENT DOCUMENTS

| | | | |
|---|---|---|---|
| JP | 2017134121 | A | 8/2017 |
| JP | 2018045064 | A | 3/2018 |
| JP | 2019045617 | A | 3/2019 |
| JP | 2019174713 | A | 10/2019 |
| JP | 2021036283 | A | 3/2021 |

\* cited by examiner

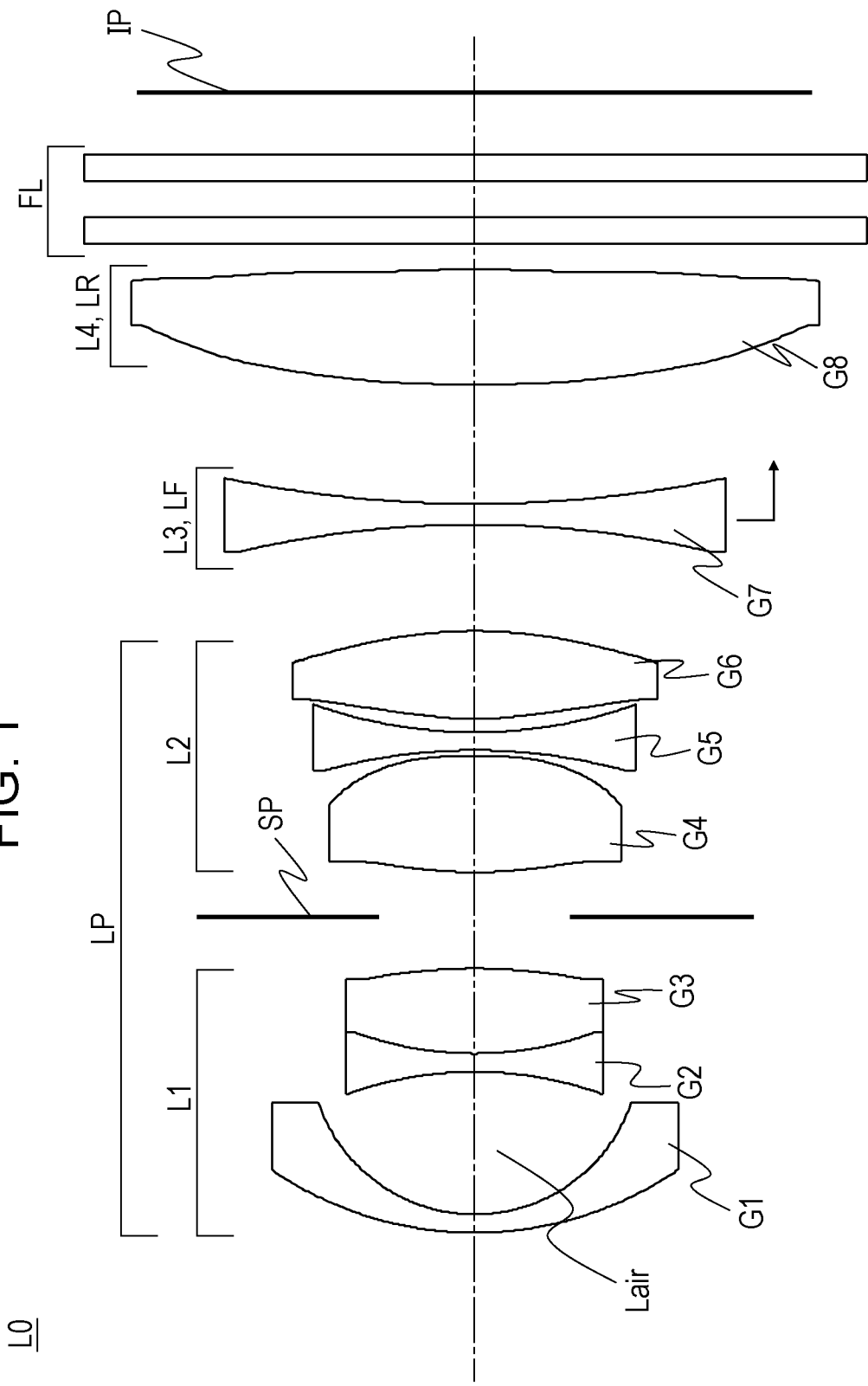

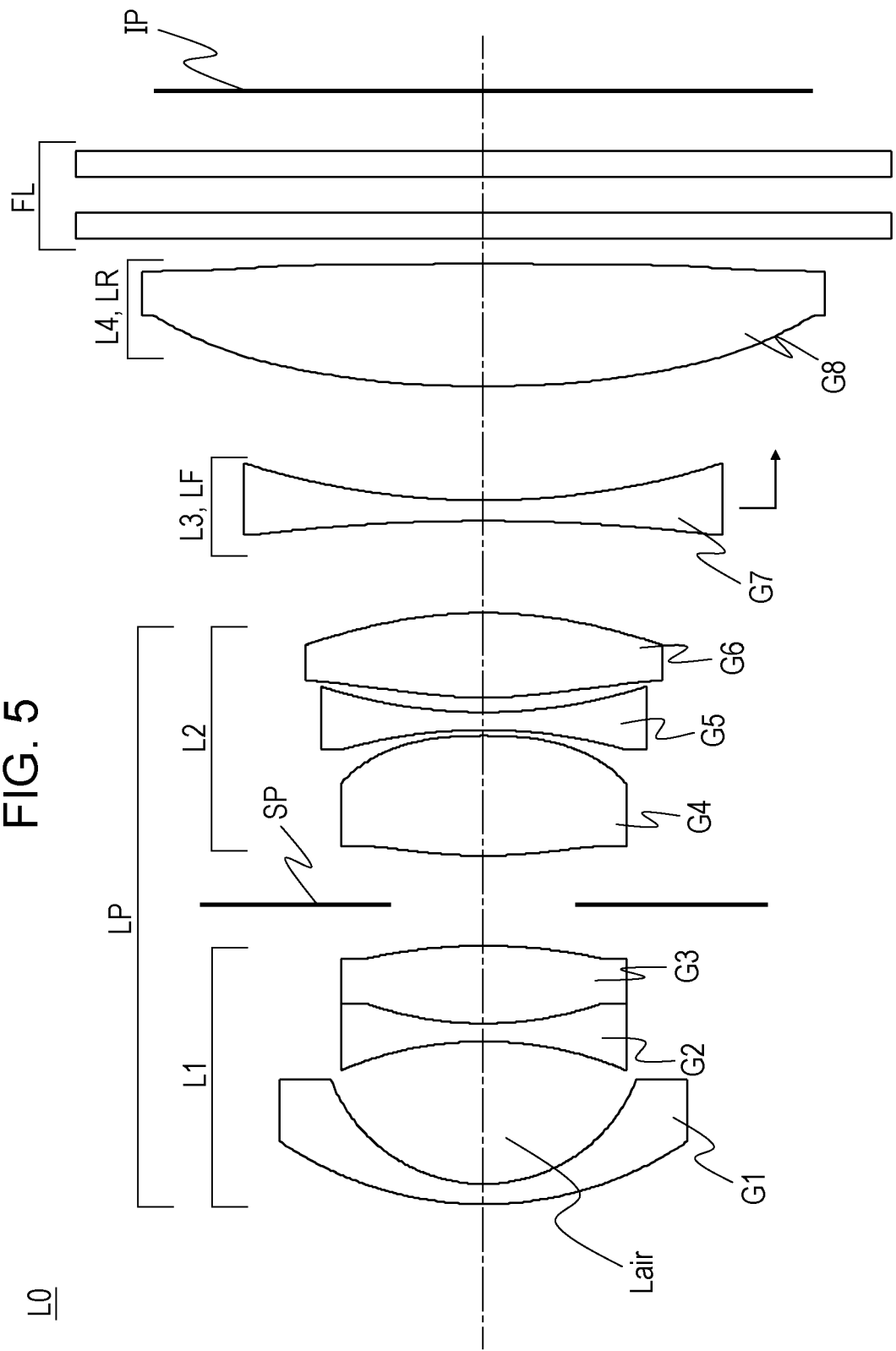

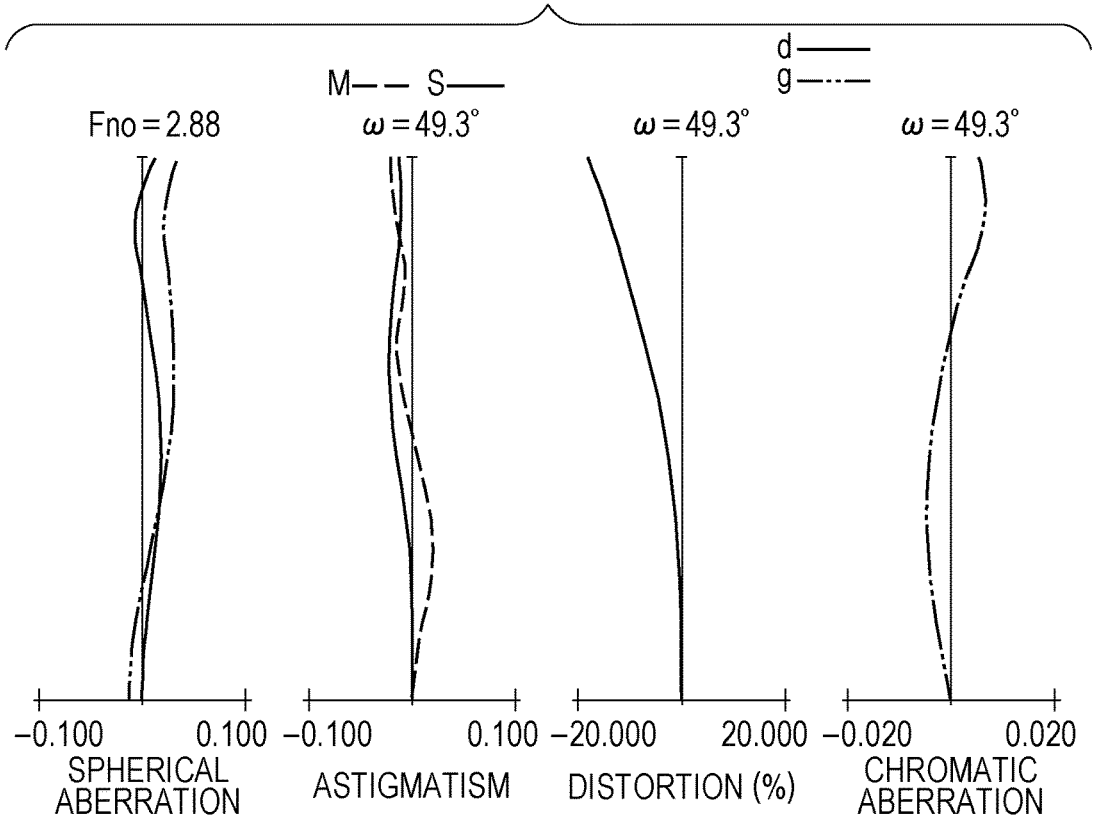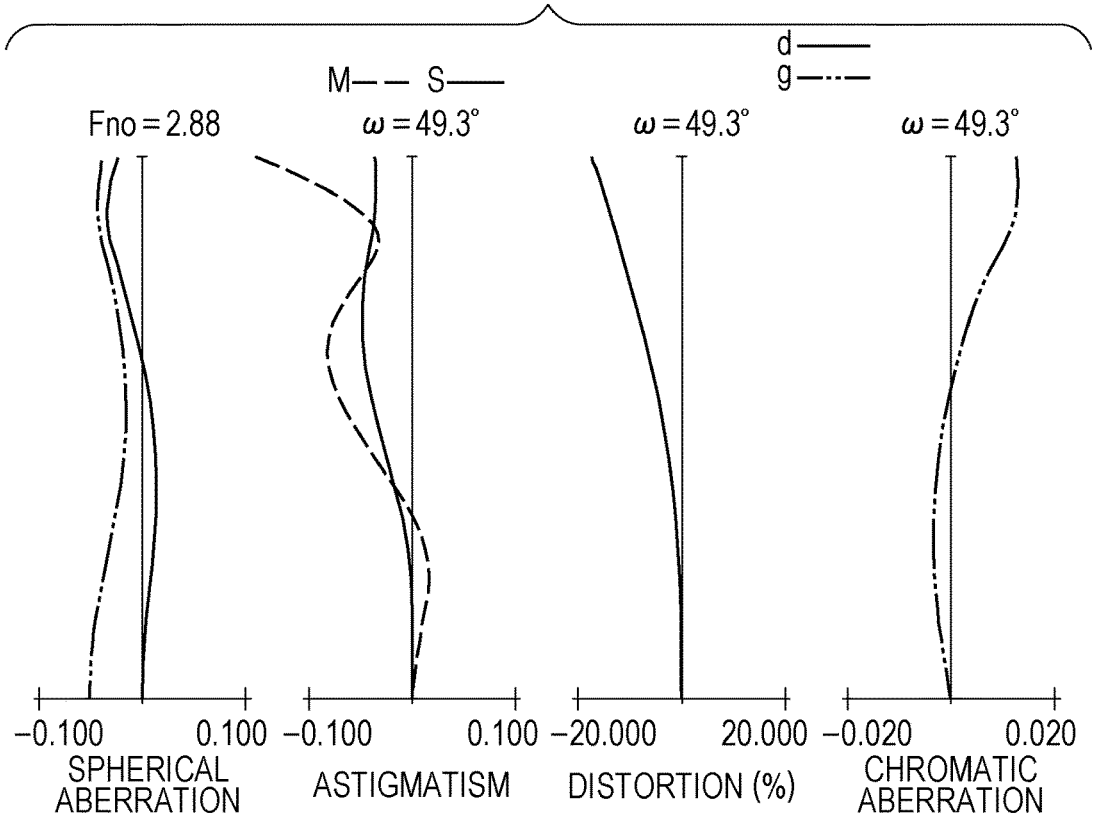

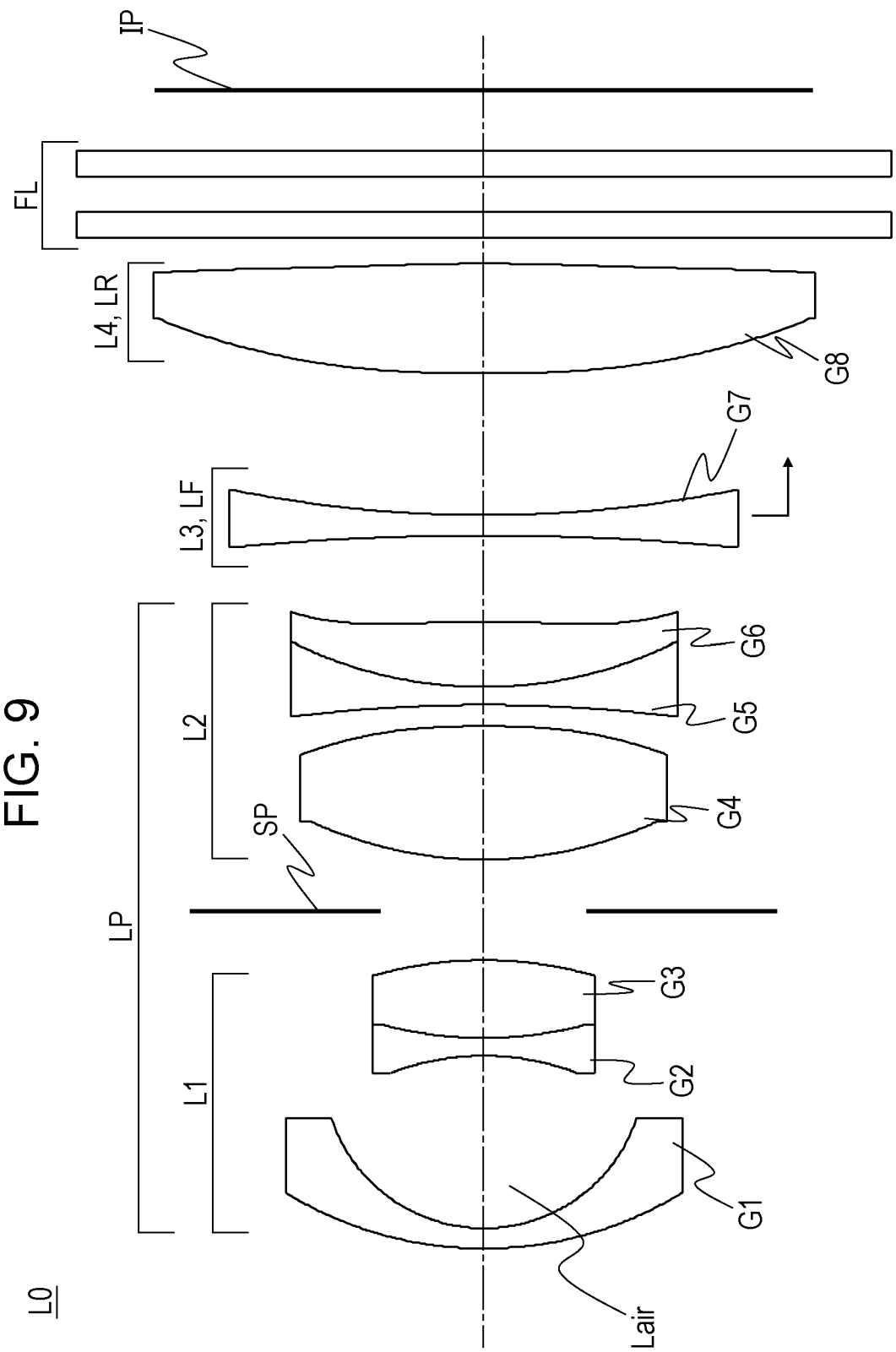

OPTICAL SYSTEM AND IMAGE CAPTURING APPARATUS INCLUDING THE SAME

BACKGROUND

Field of the Disclosure

The present disclosure relates to optical systems suitable for image capturing apparatuses such as digital video cameras, digital still cameras, broadcasting cameras, and silver-halide cameras.

Description of the Related Art

Compact wide-angle lenses having a small entire length while having good optical performance around the screen have recently been required for optical systems for use in image capturing apparatuses, such as a digital still camera and a video camera using a solid-state image sensor.

This needs to increase the positive refractive power of the optical system. However, increasing the positive refractive power may cause the Petzval sum to be positive and large, which makes it difficult to correct field curvature. This also makes it difficult to correct astigmatism. Thus, the wide-angle optical system tends to decrease in optical performance around the screen, and it is necessary to correct these defects well.

Japanese Patent Laid-Open No. 2010-176096 discloses an optical system including a lens unit with positive refractive power, a lens unit with negative refractive power, and a lens unit with positive refractive power in order from an object side.

With the technique disclosed in Japanese Patent Laid-Open No. 2010-176096, the positive refractive power of the lens unit adjacent to the object side is smaller than a lens unit that moves with focusing, which makes it difficult to make the optical system wide-angled. Even if the refractive power of the lens unit is increased, it is difficult to correct field curvature and astigmatism that occur at that time.

SUMMARY

An optical system according to embodiments of the present disclosure includes, in order from an object side to an image side, a front lens unit with positive refractive power, an intermediate lens unit, and a rear lens unit, wherein the intermediate lens unit moves to change an interval between the front lens unit and the intermediate lens unit and an interval between the intermediate lens unit and the rear lens unit in focusing from infinity to a close range, and wherein the following inequality is satisfied:

$$0.01 < fLP/EA < 0.80$$

where fLP is a focal length of the front lens unit, and EA is an effective diameter of a lens surface closest to the image side in the rear lens unit.

Further features of the present disclosure will become apparent from the following description of exemplary embodiments with reference to the attached drawings.

BRIEF DESCRIPTION OF THE DRAWINGS

FIG. 1 is a cross-sectional view of the lenses of an optical system according to a first embodiment of the present disclosure.

FIG. 5 is a cross-sectional view of the lenses of an optical system according to a third embodiment of the present disclosure.

FIGS. 6A and 6B are aberration charts of the optical system according to the third embodiment.

FIG. 9 is a cross-sectional view of the lenses of an optical system according to a fifth embodiment of the present disclosure.

DESCRIPTION OF THE EMBODIMENTS

Figure 2A:
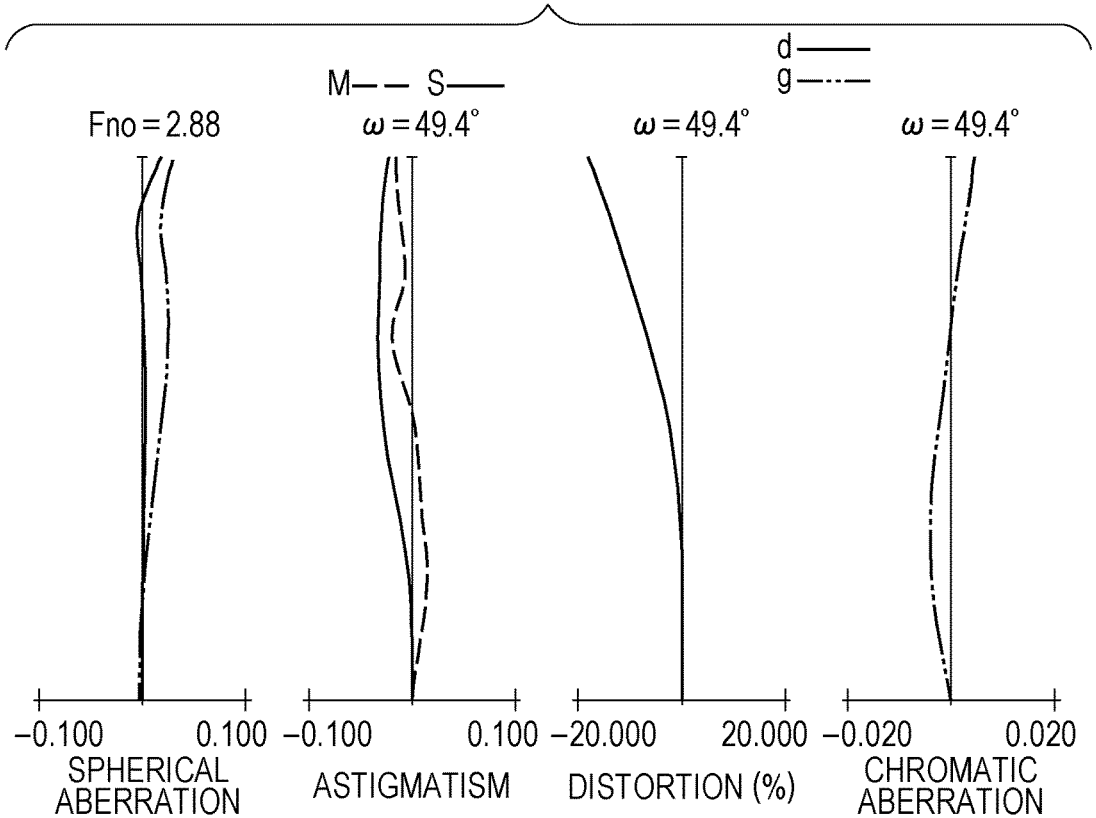
FIGS. 2A and 2B are aberration charts of the optical system according to the first embodiment.
Figure 2B:
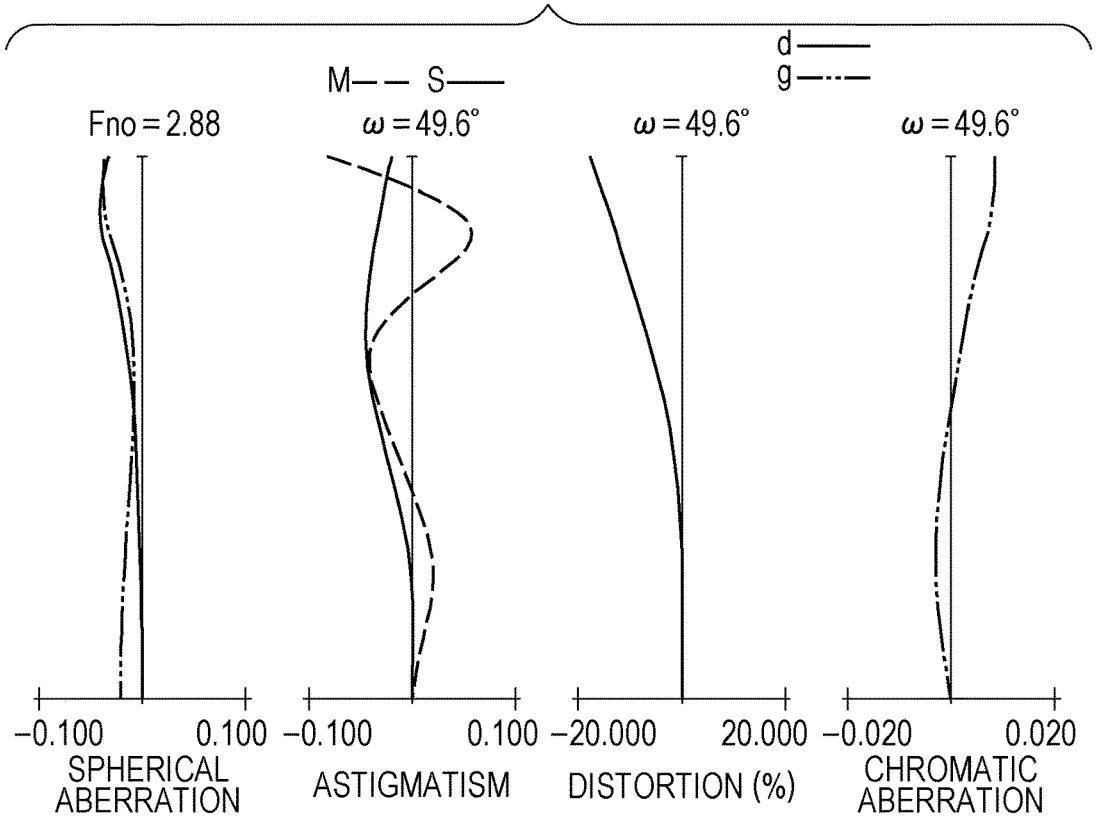
Figure 3:
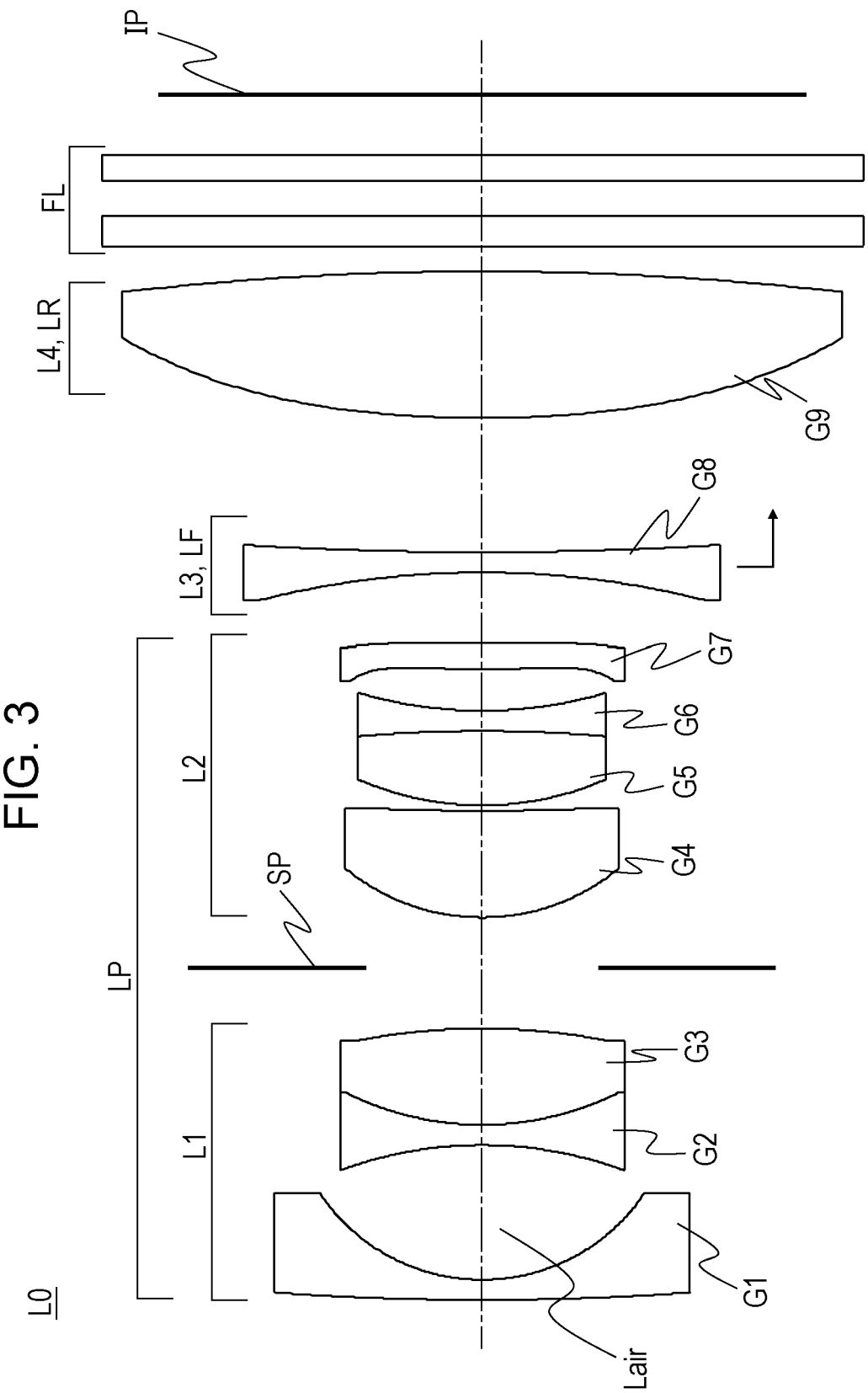
FIG. 3 is a cross-sectional view of the lenses of an optical system according to a second embodiment of the present disclosure.
Figure 4A:
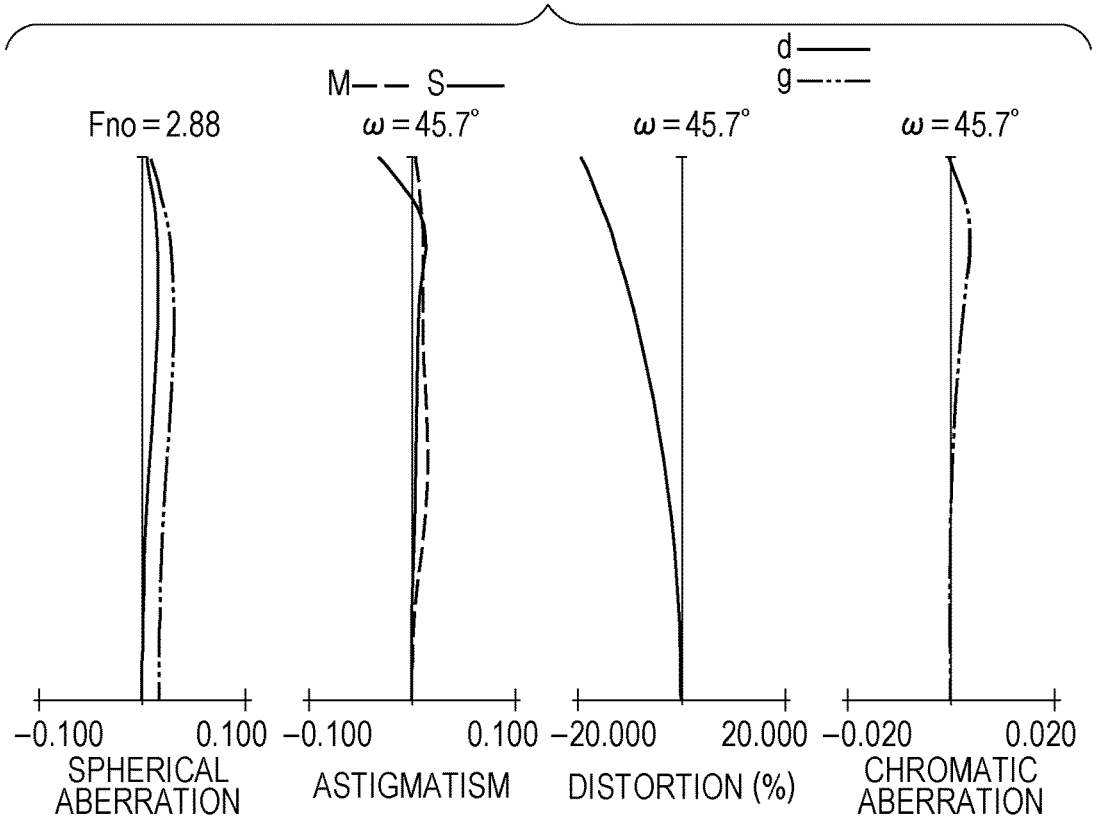
FIGS. 4A and 4B are aberration charts of the optical system according to the second embodiment.
Figure 4B:
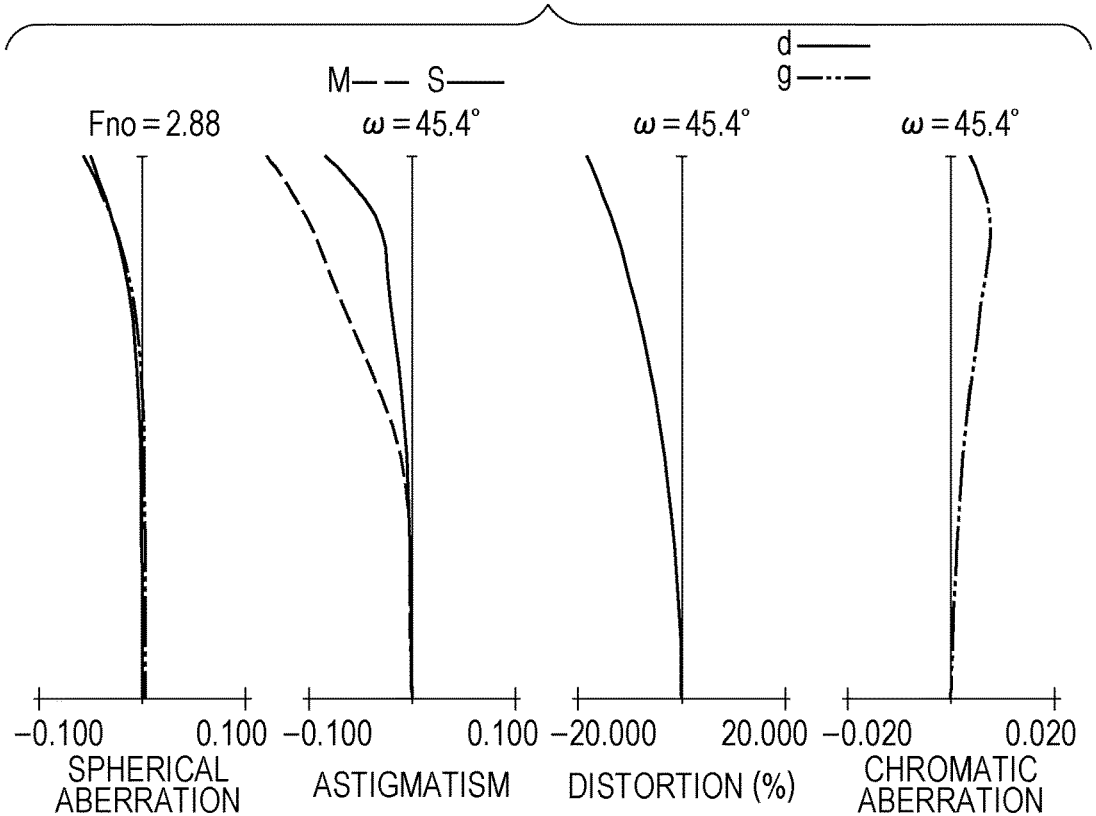
Figure 7:
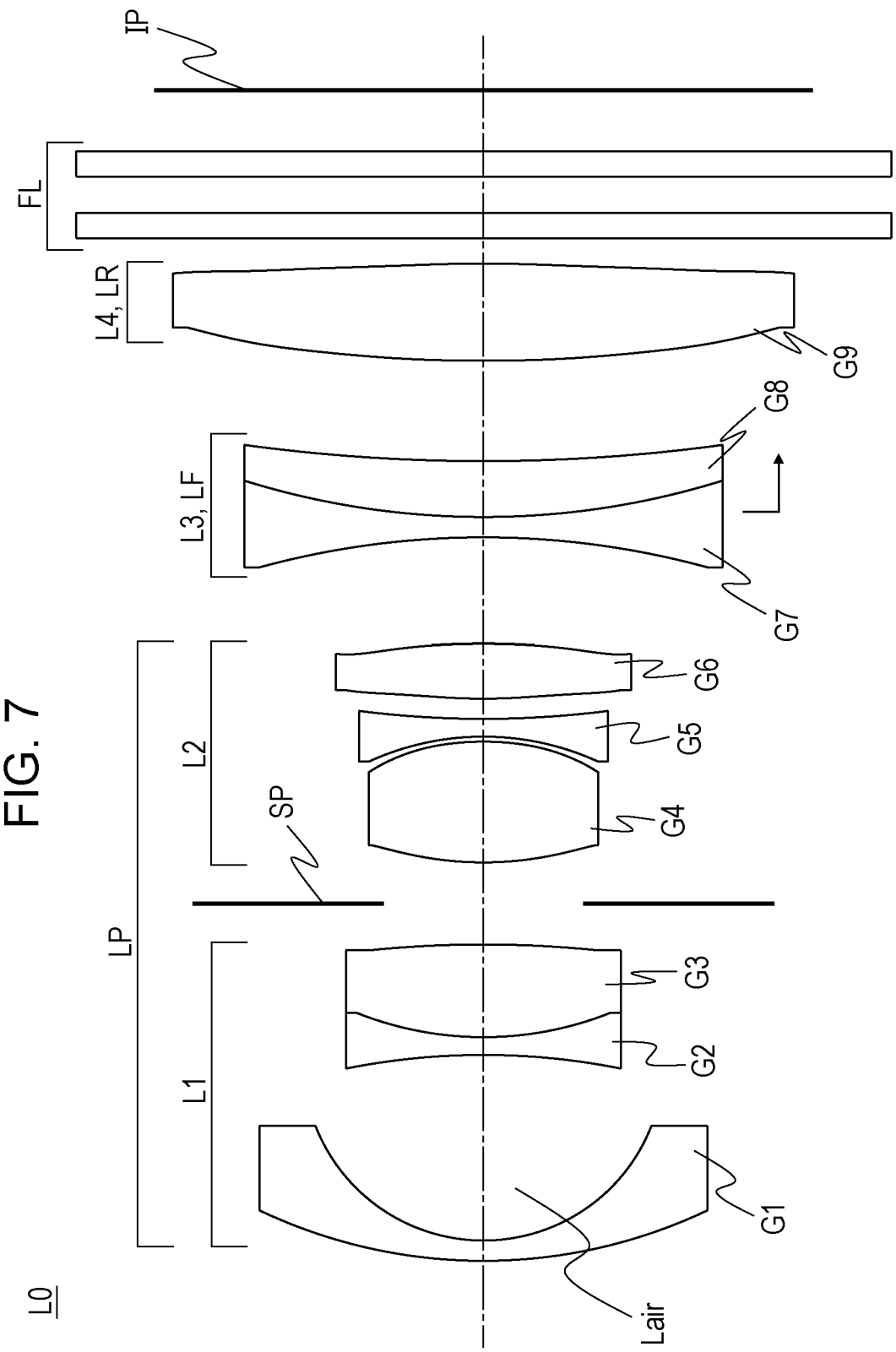
FIG. 7 is a cross-sectional view of the lenses of an optical system according to a fourth embodiment of the present disclosure.
Figure 8A:
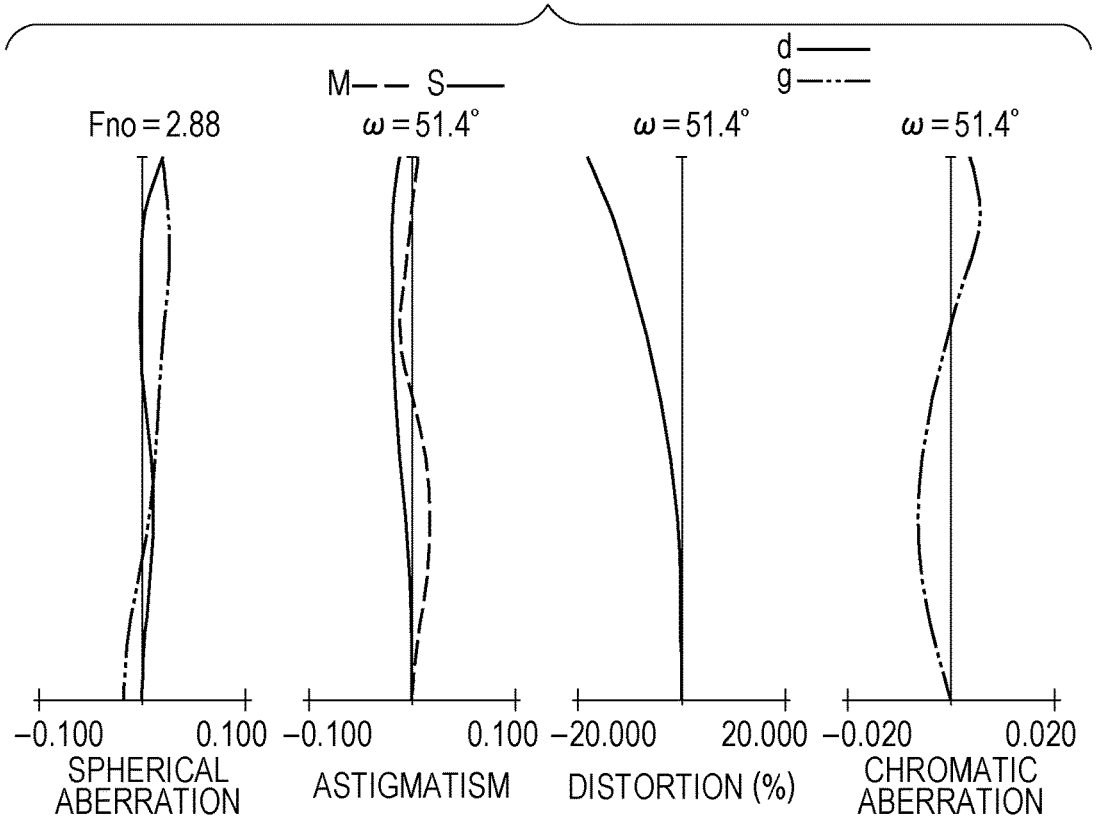
FIGS. 8A and 8B are aberration charts of the optical system according to the fourth embodiment.
Figure 8B:
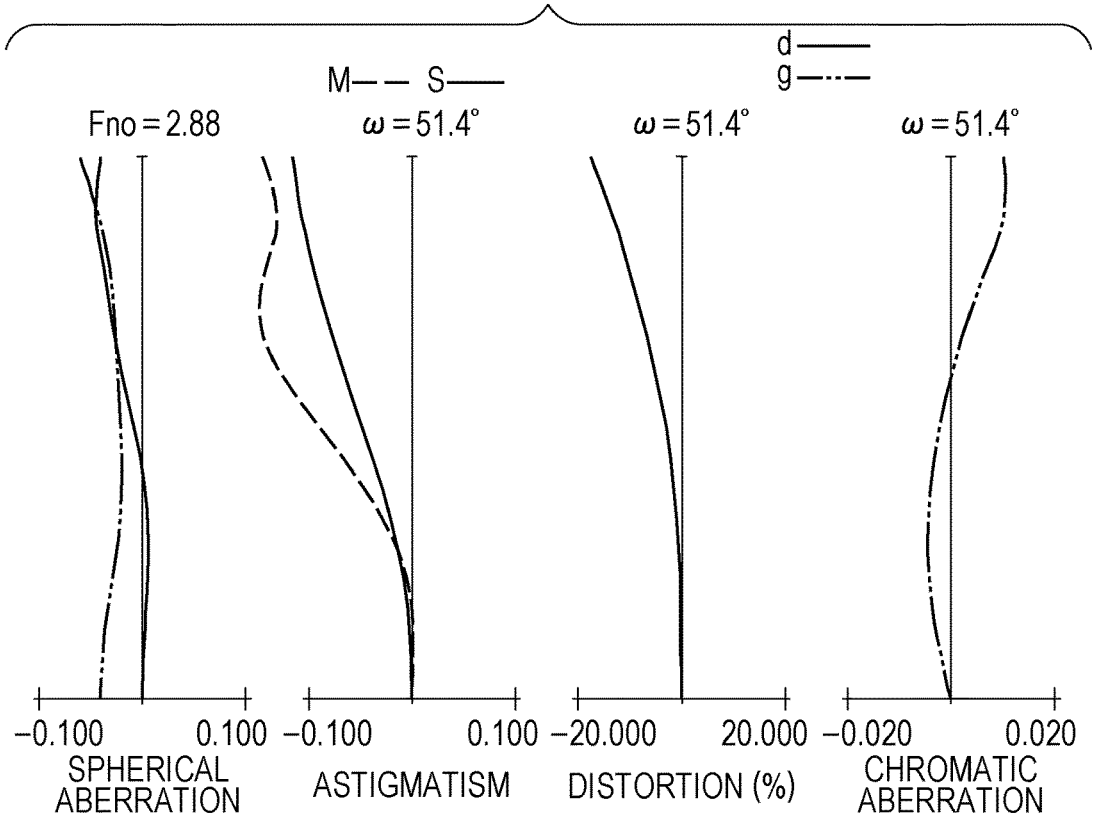
Figure 10A:
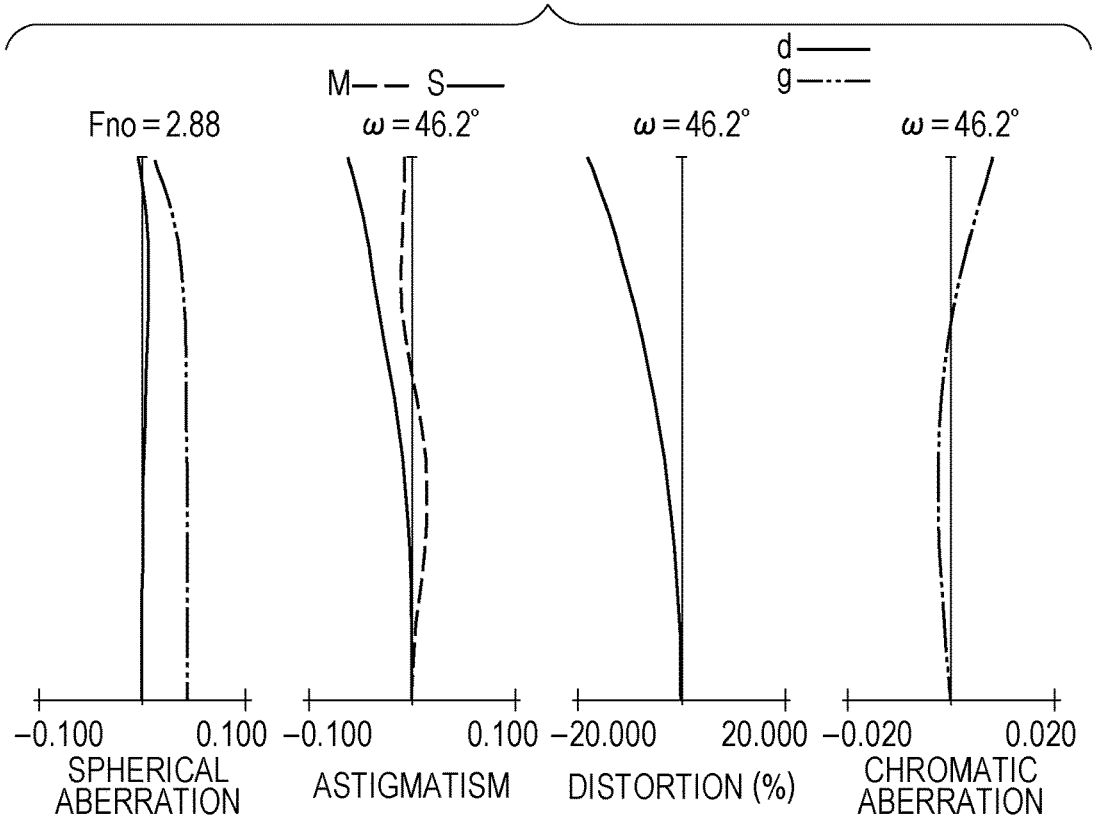
FIGS. 10A and 10B are aberration charts of the optical system according to the fifth embodiment.
Figure 10B:
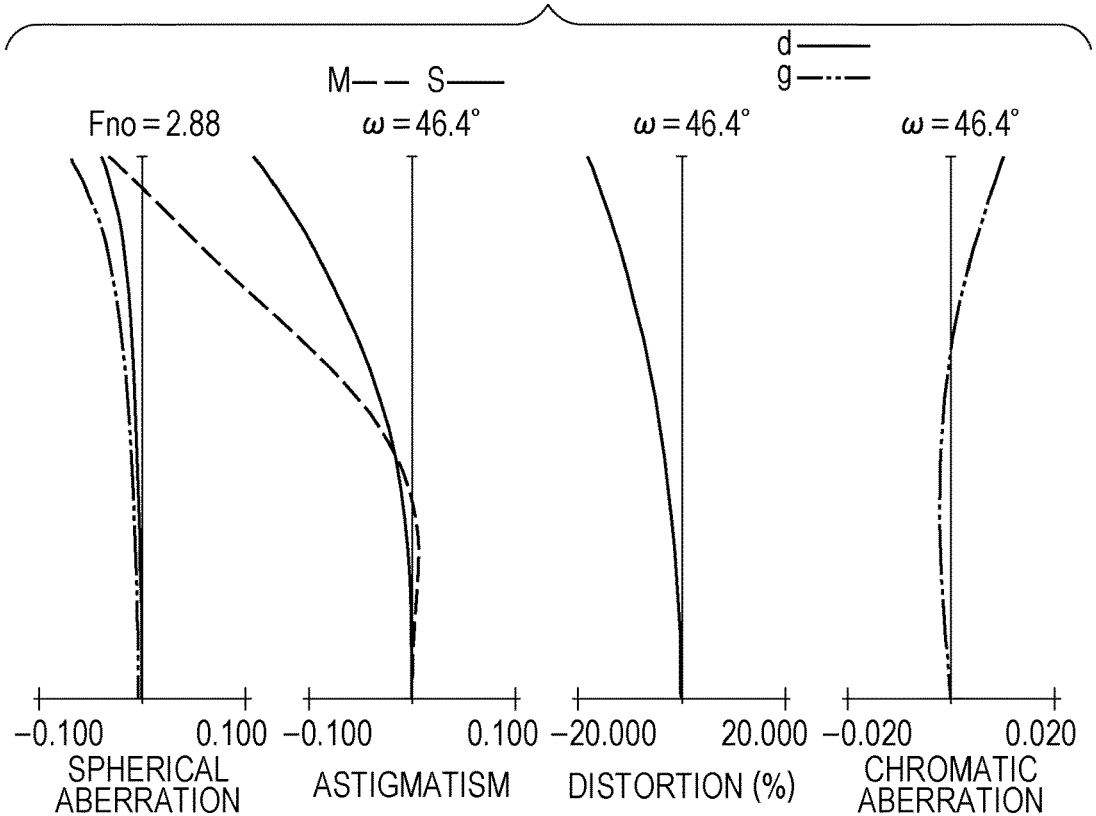
Figure 11:
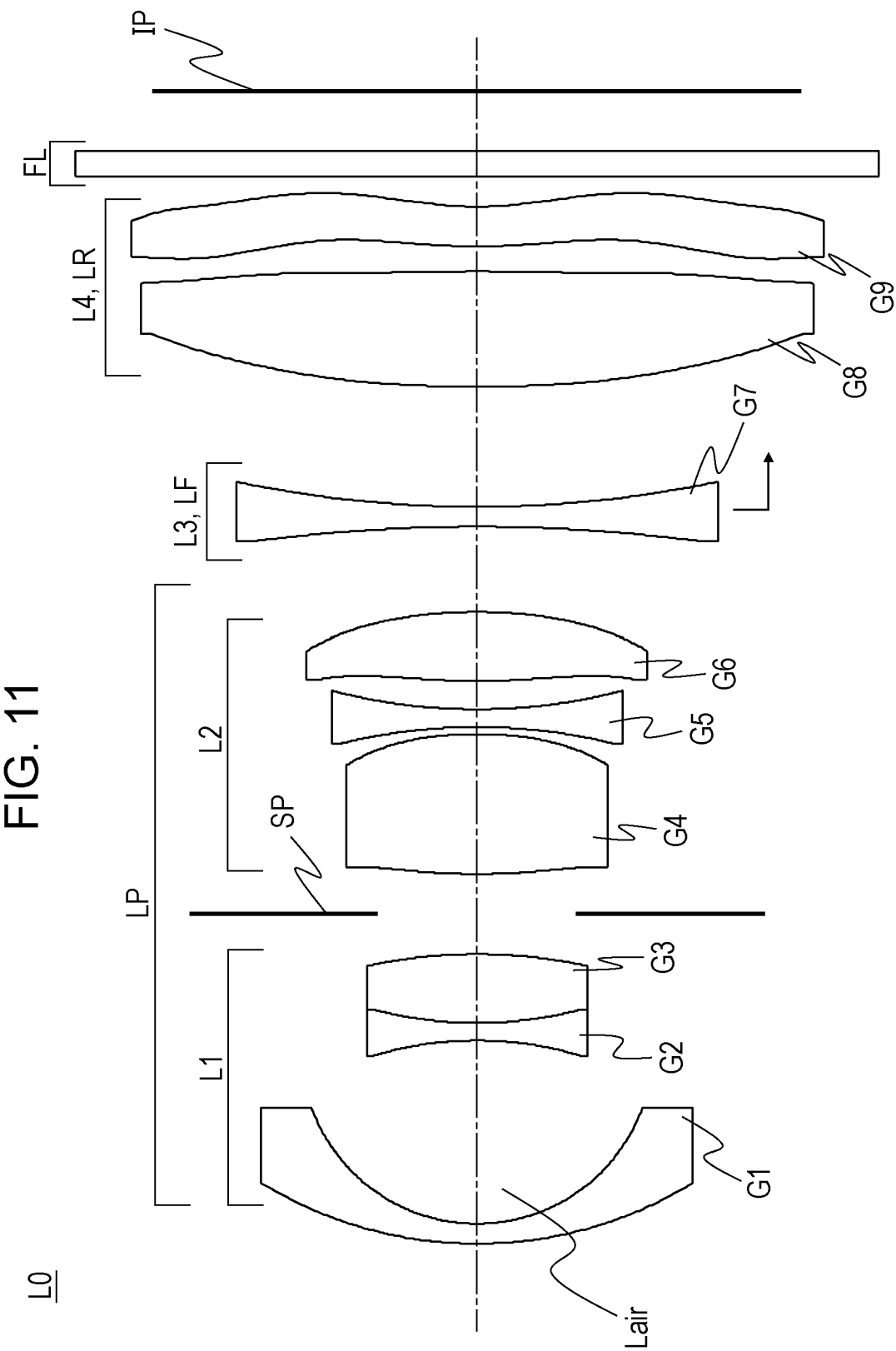
FIG. 11 is a cross-sectional view of the lenses of an optical system according to a sixth embodiment of the present disclosure.
Figure 12A:
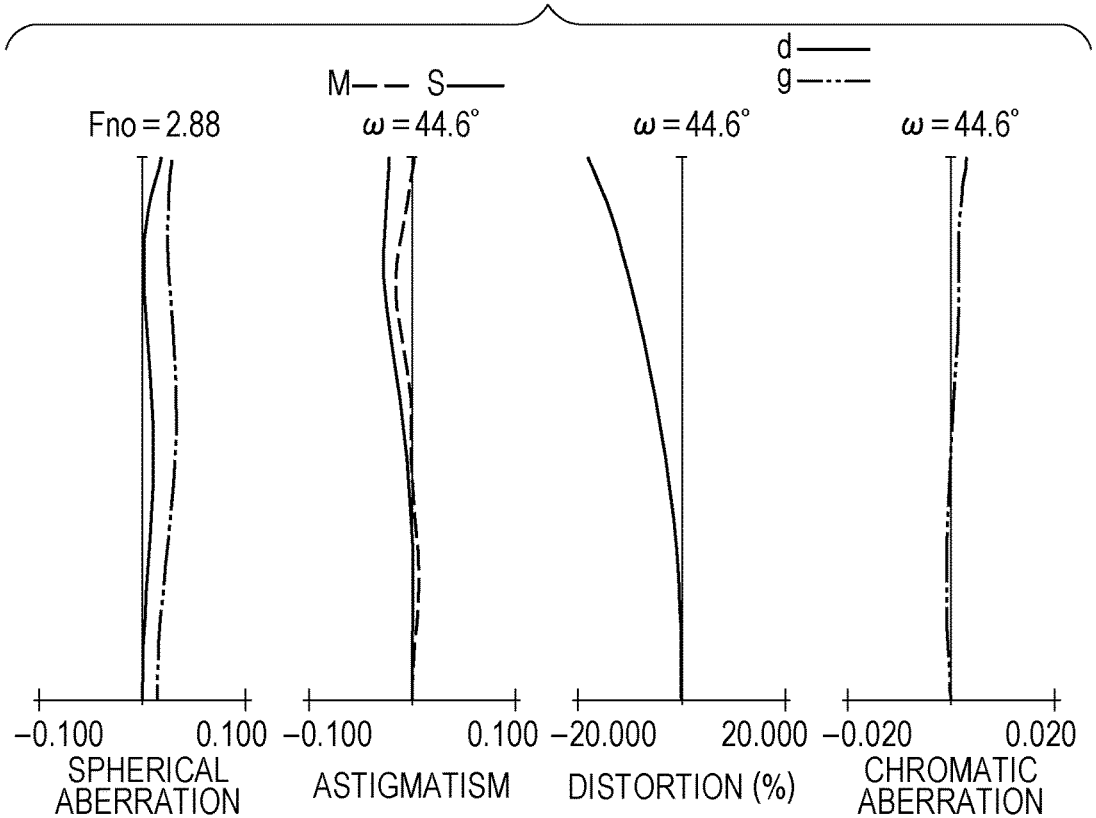
FIGS. 12A and 12B are aberration charts of the optical system according to the sixth embodiment.
Figure 12B:
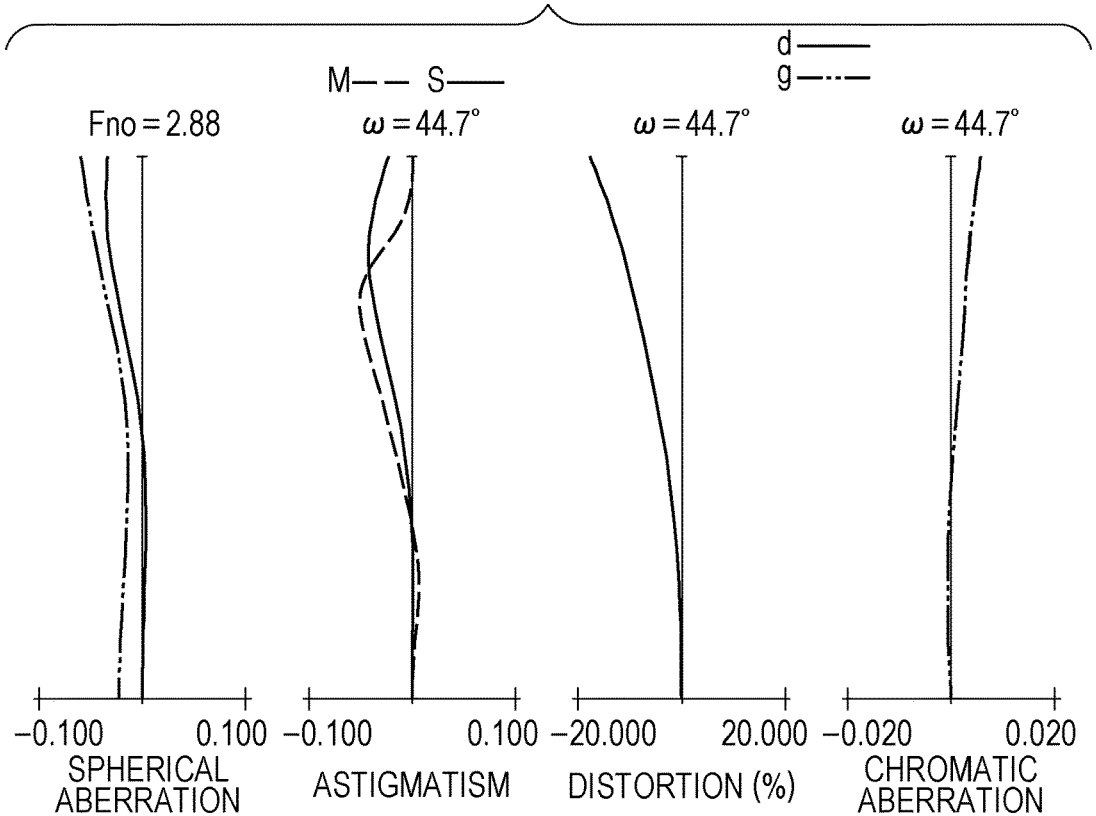

Optical systems and an image capturing apparatus including the same according to embodiments of the present disclosure will be described hereinbelow with reference to the accompanying drawings.

FIGS. 1, 3, 5, 7, 9, 11, 13 are cross-sectional views of optical systems L0 according to first to seventh embodiments in focusing on an object at infinity, respectively. The optical systems L0 of the embodiments can be used for image capturing apparatuses, such as digital video cameras, digital still cameras, broadcasting cameras, silver-halide cameras, monitoring cameras, and in-vehicle cameras.

In the lens cross-sectional views, the left side is the object side, and the right side is the image side. The optical system L0 of each embodiment may be used as a projector lens of a projector or the like. In this case, the left side is the screen side, and the right side is the projected image side.

The optical system L0 of each embodiment includes a positive front lens unit LP, an intermediate lens unit LF, and a rear lens unit LR arranged in order from the side closest to the object side to the image side.

The optical system L0 of each embodiment includes a plurality of lenses. In this specification, each of the front lens unit LP, the intermediate lens unit LF, and the rear lens unit LR is a unit of lenses that move or stand still together in focusing. Each unit may consist of one lens or consist of a plurality of lenses. Each unit may include an aperture stop.

The rear lens unit LR is a unit of all lenses on the image side of the intermediate lens unit LF. The rear lens unit LR does not include parallel plate glass or the like with no refractive power. However, the rear lens unit LR may include an optical element having no refractive power in a paraxial area but having an aspherical shape or a Fresnel shape in the periphery, and as a result, converging or diverging light.

The front lens unit LP may include a first partial unit L1 and a second partial unit L2. The first partial unit L1 and the second partial unit L2 are separated from each other by an aperture stop SP in the front lens unit LP. The intermediate lens unit LF may also be referred to as "third lens unit L3". The rear lens unit LR may also be referred to as "fourth lens unit L4".

The arrow shown in each lens cross-sectional view indicates the moving direction of the lens unit in focusing from infinity to a close range. In the optical system L0 of each embodiment, the intermediate lens unit LF moves so that the interval between the front lens unit LP and the intermediate lens unit LF and the interval between the intermediate lens unit LF and the rear lens unit LR change in focusing from infinity to a close range. The lens units other than the intermediate lens unit LF may be moved in focusing.

Reference sign SP in each lens cross-sectional view denotes an aperture stop. Reference sign IP denotes an image plane. In using the optical system L0 of each embodiment as an imaging optical system for a digital still camera or a digital video camera, an imaging plane of a solid-state image sensor (a photoelectric conversion element), such as a charge-coupled device (CCD) sensor or a complementary metal-oxide semiconductor (CMOS) sensor, is disposed at the image plane IP.

In using the optical system L0 of each embodiment as an imaging optical system for a silver-halide camera, a photosensitive surface corresponding to a film surface is disposed at the image plane IP.

Reference sign FL denotes an optical block corresponding to an optical filter, a face plate, a crystal low-pass filter, an infrared cut filter, or the like.

Reference sign Gj (j is a natural number) denotes a j-th lens that is the j-th lens counted from the object side.

FIGS. 2A and 2B, 4A and 4B, 6A and 6B, 8A and 8B, 10A and 10B, 12A and 12B, and 14A and 14B are aberration charts of the optical systems L0 according to first to seventh embodiments, respectively. In the aberration charts, each of FIGS. 2A, 4A, 6A, 8A, 10A, 12A, and 14A is a respective aberration chart in focusing on an object at infinity, and each of FIGS. 2B, 4B, 6B, 8B, 10B, 12B, and 14B is a respective aberration chart in focusing on a distance at which the paraxial lateral magnification of the optical system L0 is −0.1.

In the aberration charts, reference sign Fno denotes F-number, which shows the amount of spherical aberration for d-line (wavelength: 587.6 nm) and the amount of spherical aberration for g-line (wavelength: 435.8 nm). In the astigmatism charts, reference sign S denotes the amount of aberration on a sagittal image plane, and M denotes the amount of aberration on a meridional image plane. The distortion aberration charts show the amount of distortion for d-line. The chromatic aberration charts show the amount of chromatic aberration of magnification for g-line. Reference sign w denotes an image-capturing half angle of view)(°.

Next, the characteristics of the optical systems L0 of the embodiments will be described.

The optical system L0 of each embodiment is configured to satisfy the following inequality:

$$0.01 < fLP/EA < 0.80 \tag{1}$$

where fLP is the focal length of the front lens unit LP, and EA is the effective diameter of the lens surface closes to the image side in the rear lens unit LR.

The configuration in which the positive front lens unit LP, the intermediate lens unit LF, and the rear lens unit LR are arranged in order from the object side to the image side allows inner focusing using the intermediate lens unit LF while sufficiently increasing the angle of view of the optical system L0 using the strong refractive power of the positive front lens unit LP. The configuration in which the intermediate lens unit LF is used for inner focusing prevents a change in the entire length of the optical system L0, reducing the entire length of the optical system L0.

Disposing the rear lens unit LR on the image side of the intermediate lens unit LF allows aberration that occurs in the intermediate lens unit LF to be corrected by the rear lens unit LR even if the refractive power of the intermediate lens unit LF is increased, allowing both of the wide angle of view of the optical system and improvement in performance around the screen to be attained.

Since the refractive power of the intermediate lens unit LF can be increased, the focusing sensitivity of the intermediate lens unit LF (the ratio of the amount of movement of the image plane IP to the amount of movement of the intermediate lens unit LF) can be increased. This allows decreasing the amount of movement of the intermediate lens unit LF in focusing, allowing an air space necessary for focusing in front of and behind the intermediate lens unit LF to be decreased. This allows reducing the size of the optical system L0. The decrease in the amount of movement of the intermediate lens unit LF in focusing allows high-speed autofocusing (AF).

Next, the technical sense of the above-described Inequality (1) will be described.

Inequality (1) defines the ratio of the focal length fLP of the front lens unit LP to the effective diameter EA of the surface closest to the image side in the rear lens unit LR. This shows that it is preferable that fLP be small and EA be large in the range of Inequality (1).

Decreasing fLP allows the focal length of the optical system L0 to be decreased, and the angle of view of the optical system L0 to be increased.

In general, both of on-axis light and off-axis light are well converged at the surface closest to the image side in the optical system, and the effective diameter of the lens surface closest to the image side is determined by the height of the position of the lens surface through which the off-axis light passes from the optical axis. In other words, the effective diameter of the lens surface closest to the image side is determined by the positions through which the on-axis light and the off-axis light pass determined by the power arrangement of the optical system. Accordingly, the large effective diameter of the surface of the optical system closest to the image side indicates that the off-axis light passes through the surface at a sufficient distance from the on-axis light in the direction perpendicular to the optical axis.

When the off-axis light passes through the lens surface closest to the image side at a sufficient distance from the on-axis light in the direction perpendicular to the optical axis, off-axis field curvature and astigmatism can be corrected without little influence on spherical aberration and coma aberration. This allows improving the optical performance around the screen without affecting the center of the screen.

The effective diameter EA is the diameter of the area of the lens surface on which light is incident. In other words, the effective diameter EA of a certain lens surface is the diameter of an area determined by a position through which light of the light incident on the lens surface passes. The position is farthest from the optical axis in the direction perpendicular to the optical axis.

A decrease in fLP below the lower limit of Inequality (1) may be advantageous in increasing the angle of view of the optical system L0 but may excessively increase the spherical aberration and the field curvature that occur in the front lens unit LP in the downward direction. An increase in EA below the lower limit of Inequality (1) may excessively increase the diameter of the rear lens unit LR to increase the size of the optical system in the radial direction.

An increase in fLP beyond the upper limit of Inequality (1) may make it difficult to make the optical system wide-angled. A decrease in EA beyond the upper limit of Inequality (1) may cause the on-axis light and the off-axis light that pass through the surface closest to the image side in the rear lens unit LR not to be sufficiently separated in the direction perpendicular to the optical axis, which may make it difficult to selectively correct the field curvature and the astigmatism.

At least one of the upper limit and the lower limit of the numerical range of Inequality (1) is preferably in the range of Inequality (1a).

$$0.10 < fLP/EA < 0.75 \quad (1a)$$

More preferably, at least one of the upper limit and the lower limit of the numerical range of Inequality (1) is in the range of Inequality (1b).

$$0.20 < fLP/EA < 0.68 \quad (1b)$$

Setting at least one of the upper limit and the lower limit of the numerical range of Inequality (1) in the range of Inequality (1c) provides the maximum advantageous effects of the inequalities described above.

$$0.30 < fLP/EA < 0.60 \quad (1c)$$

Next, configurations that may be satisfied in the optical systems L0 of the embodiments will be described.

The front lens unit LP of the optical system L0 of each embodiment includes a first partial unit L1, an aperture stop SP, and a positive second partial unit L2 in order from the object side. Disposing lens units (partial units) in front of and behind the aperture stop SP allows off-axis light to pass through the lens surfaces substantially symmetrically in front of and behind the aperture stop SP. This allows for correcting field curvature and distortion. Disposing a lens unit on the object side of the aperture stop SP causes so-called pupil coma aberration to increase the aperture efficiency for off-axis light (the ratio of the cross-sectional area perpendicular to the optical axis of on-axis incident light to the cross-sectional area perpendicular to the optical axis of off-axis incident light. This allows increasing the relative peripheral illumination ratio (the ratio of luminance at the image plane), which is an issue of a wide-angle optical system.

The first partial unit L1 includes three lenses, a meniscus lens with negative refractive power, a lens with negative refractive power, and a lens with positive refractive power, in order from the object side. In the first to sixth embodiments, lenses G1 to G3 correspond to the above lenses. Another lens may be disposed on the object side of the three lenses, as in the seventh embodiment. The lens may be disposed on the image side of the three lenses in the first partial unit L1.

At least one surface of the three lenses of the first partial unit L1 may have an aspherical shape. This allows the field curvature and distortion to be corrected well.

Figure 13:
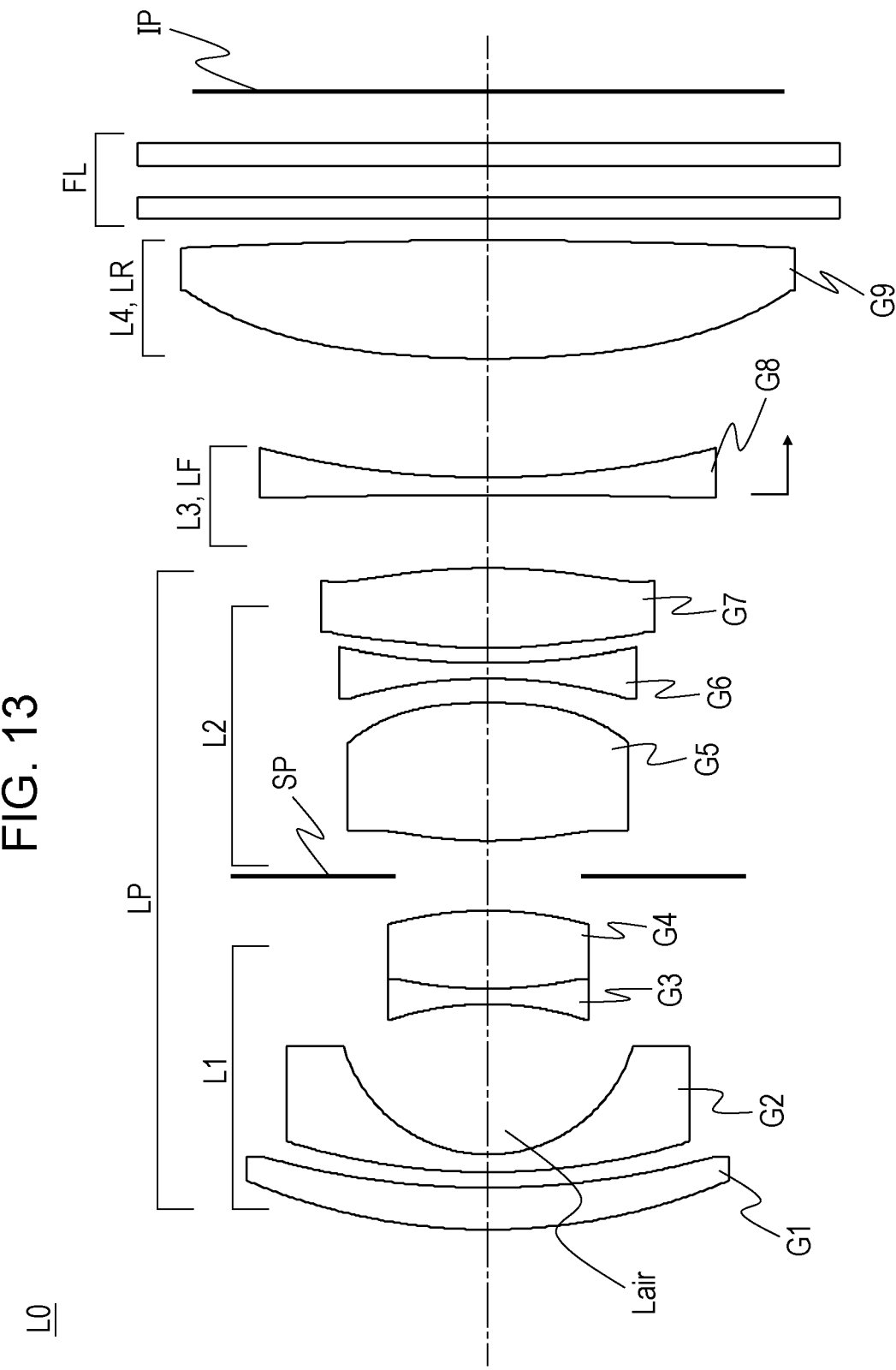
FIG. 13 is a cross-sectional view of the lenses of an optical system according to a seventh embodiment of the present disclosure.
Figure 14A:
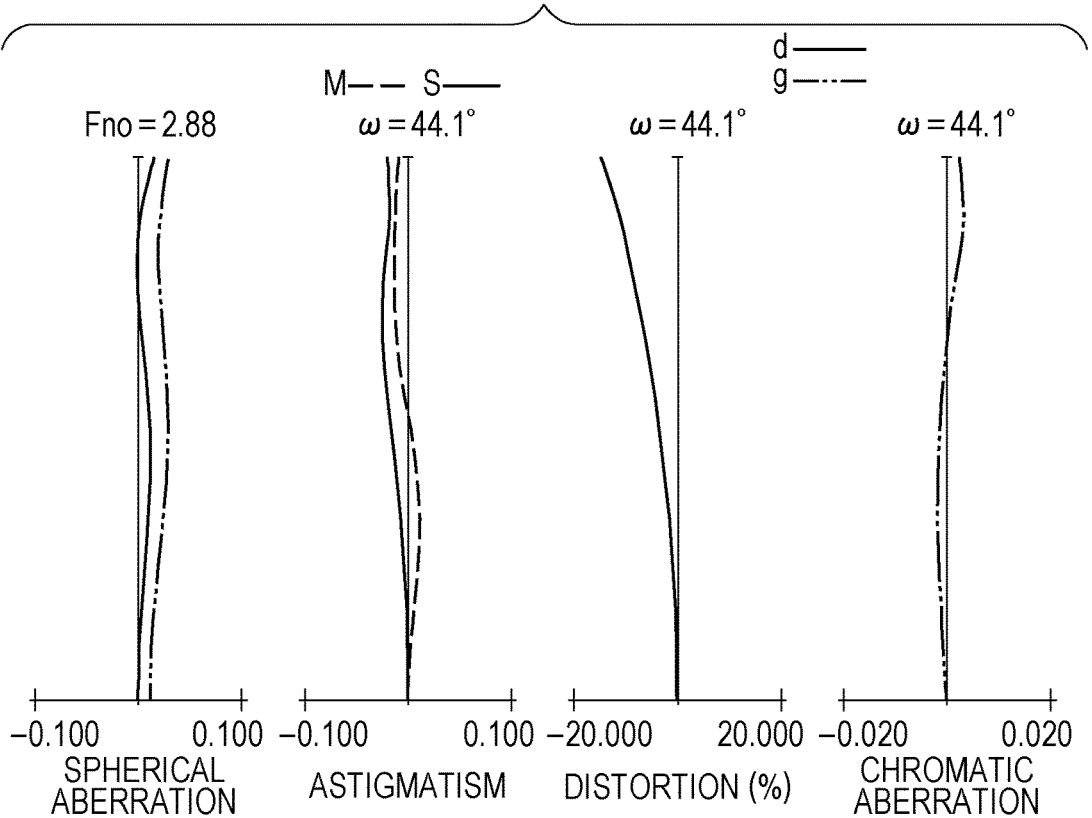
FIGS. 14A and 14B are aberration charts of the optical system according to the seventh embodiment.
Figure 14B:
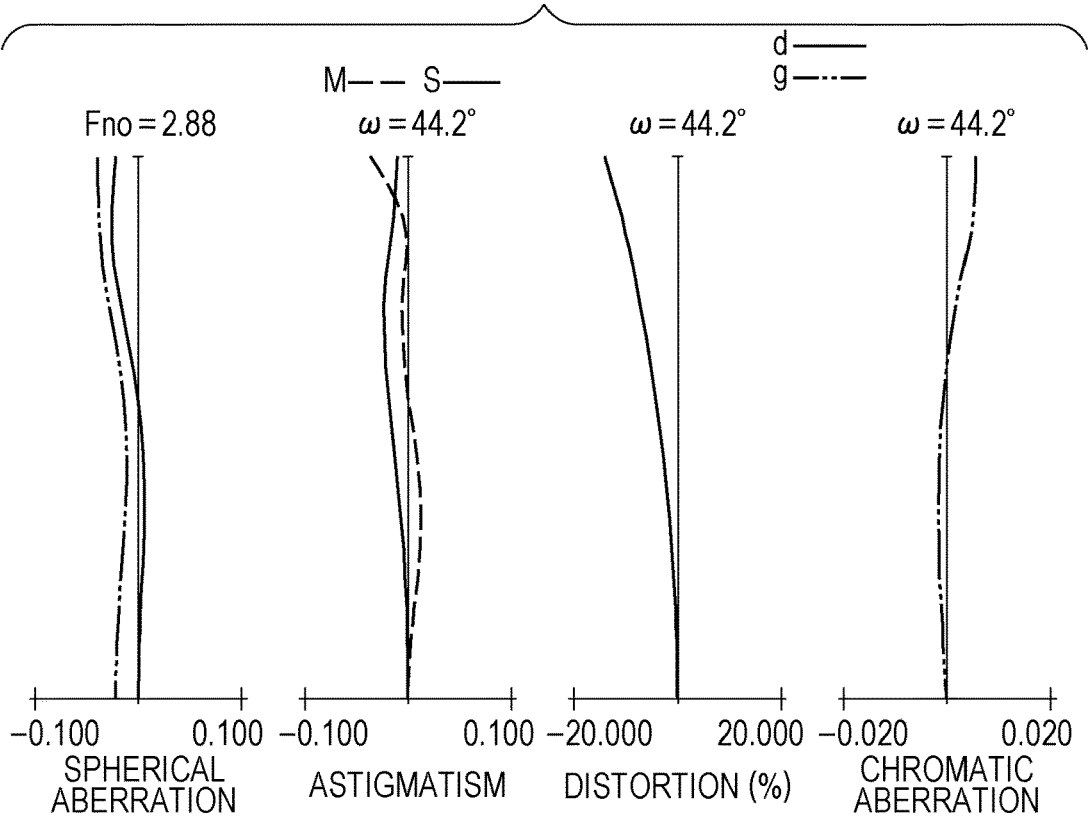

In the seventh embodiment, lenses G2 to G4 correspond to the three lenses of the first partial unit L1, and a positive lens G1 is disposed on the object side of the three lenses G2 to G4, as shown in FIG. 13.

Making the Petzval sum negative using the two negative lenses included in the first partial unit L1 allows the positive Petzval sum of the entire optical system L0 to be decreased. This allows the field curvature to be corrected well. This also allows the distortion to be corrected well.

Furthermore, the lateral chromatic aberration can also be corrected well using the negative lenses and the positive lens included in the first partial unit L1.

The first partial unit L1 includes a biconvex air lens Lair. Wide-angle optical systems tend to cause barrel-shaped distortion due to strong positive refractive power. However, disposing the air lens Lair in the first partial unit L1 allows the barrel-shaped distortion and field curvature to be corrected well using the strong negative refractive power of the air lens Lair.

The air space constituting the air lens Lair may be the largest (in the case where the optical system L0 is a zoom lens, the air space that is the largest from the wide-angle end to the telephoto end) among the air spaces between the surface closest to the object side to the surface closest to the image side in the optical system L0. This refers to decreasing the other air spaces while obtaining strong negative refractive power using the air lens Lair. This allows reduction in the size of the optical system L0 while correcting the aberration.

The positive second partial unit L2 includes at least two lenses Gp with positive refractive power and at least one lens Gn with negative refractive power. The second partial unit L2 disposed directly behind the aperture stop SP mainly corrects axial chromatic aberration and spherical aberration. This allows the axial chromatic aberration to be corrected well by combining the positive lenses with small dispersive power and the negative lens with large dispersive power.

The second partial unit L2 tends to have strong positive refractive power to make the optical system L0 wide-angled, which may cause the spherical aberration downward. Accordingly, disposing at least two lenses Gp with positive refractive power in the second partial unit L2 allows necessary positive refractive power to be shared by the plurality of positive lenses, thereby increasing the absolute value the radius of curvature of each positive lens. This can reduce or eliminate the occurrence of spherical aberration.

At least one surface of the lenses Gp with positive refractive power may have an aspherical shape to increase the effect of correcting the spherical aberration. In particular, the surface may have a shape whose radius of paraxial curvature decreases in the periphery of the lens surface.

The intermediate lens unit LF may include a single lens that has negative refractive power and that is concave on the object side or a cemented lens with negative refractive power as a whole. The intermediate lens unit LF moves in focusing, so that variations in field curvature in focusing may cause problems. For this reason, disposing the single lens with negative refractive power and having a concave surface on the object side or the cemented lens with negative refractive power as a whole in the intermediate lens unit LF allows light to enter the concave surface at a substantially right angle. The light incident on the surface at a substantially right angle is not greatly refracted by the surface. This reduces variations in field curvature even if the intermediate lens unit LF moves with focusing.

The rear lens unit LR may include a single lens with positive refractive power. This allows off-axis light to be refracted near the image plane IP, providing a telecentric property sufficient for the solid-state image sensor and allows the astigmatism to be corrected.

In the optical system L0 of each embodiment, image blur may be corrected by moving one or a plurality of lenses in the direction perpendicular to the optical axis.

Next, conditions that are preferably satisfied by the optical system L0 of each embodiment will be described.

It is preferable that the optical system L0 of each embodiment satisfy the following inequality:

$$0.20 < DSP/T < 1.00 \quad (2)$$

where DSP is the distance from the aperture stop SP to the lens surface closest to the image side in the rear lens unit LR, and T is the distance from the aperture stop SP to the image plane IP.

It is preferable that the optical system L0 of each embodiment satisfy the following inequality:

$$0.00 < fL2/|fL1| < 0.80 \quad (3)$$

where fL1 is the focal length of the first partial unit L1, and fL2 is the focal length of the second partial unit L2.

It is preferable that the optical system L0 of each embodiment satisfy the following inequality:

$$0.00 < |fLF|/|fL1| < 1.50 \quad (4)$$

where fLF is the focal length of the intermediate lens unit LF.

It is preferable that the optical system L0 of each embodiment satisfy the following inequality:

$$0.30 < fLP/(f \times \tan \omega) < 1.50 \quad (5)$$

where f is the focal length of the entire optical system L0, and ω is the half angle of view of the optical system L0.

It is preferable that the optical system L0 of each embodiment satisfy the following inequality:

$$1.50 < (1 - \beta LF^2) \times \beta LR^2 < -0.40 \quad (6)$$

where βLF is the lateral magnification of the intermediate lens unit LF in focusing on an object at infinity, and βLR is the lateral magnification of the rear lens unit in focusing on an object at infinity.

It is preferable that the optical system L0 satisfy the following inequalities:

$$55 < vp < 120 \quad (7)$$

$$15 < vn < 35 \quad (8)$$

where vp is the Abbe number of the lens Gp with positive refractive power included in the second partial unit L2, and vn is the Abbe number of the lens Gn with negative refractive power included in the second partial unit L2. At least one of the positive lenses Gp of the second partial unit L2 and at least one of the negative lenses Gn need only satisfy the inequalities.

It is preferable that the optical system L0 satisfy the following inequality:

$$0.02 < MF/DSP < 0.15 \quad (9)$$

where MF is the amount of movement of the intermediate lens unit LF in focusing on a distance where the paraxial lateral magnification of the optical system L0 is −0.1 with reference to focusing on an object at infinity, where the sign of the amount of movement is positive in the direction of light travel (the direction from the object side to the image side).

It is preferable to satisfy the following inequalities:

$$0.20 < fLP/DSP < 0.80 \quad (10)$$

$$0.30 < fL2/EA < 1.20 \quad (11)$$

It is preferable to satisfy the following inequality:

$$-0.50 < fLair/|fL1| < 0.00 \quad (12)$$

where fLair is the focal length of the air lens Lair of the first partial unit L1.

It is preferable to satisfy the following inequality:

$$0.05 < Dair/L < 0.30 \quad (13)$$

where Dair is the air space (the thickness on the optical axis (a maximum value when Dair is variable) constituting the air lens Lair of the first partial unit L1, and L is the distance from the surface closest to the object side to the surface closest to the image side in the optical system L0.

It is preferable to satisfy the following inequality:

$$-1.00 < S/R < 0.00 \quad (14)$$

where R is the radius of curvature of the surface closest to the object side of the single lens with negative refractive power or the cemented lens with negative refractive power as a whole included in the intermediate lens unit LF, and S is the distance from the aperture stop SP to the surface closest to the object side of the single lens with negative refractive power or the cemented lens with negative refractive power included in the intermediate lens unit LF in focusing on an object at infinity.

It is preferable to satisfy the following inequality:

$$-3.00 < fLF/f < -1.00 \quad (15)$$

It is preferable to satisfy the following inequality:

$$0.00 < fLRp/|fL| < 1.50 \quad (16)$$

where fLRp is the focal length of the single lens with positive refractive power included in the rear lens unit LR.

Next, the technical senses of the above-described Inequalities (2) to (16) will be described.

Inequality (2) defines the ratio of the distance DSP from the aperture stop SP to the lens surface closest to the image side in the rear lens unit LR to the distance T from the aperture stop SP to the image plane IP. This shows that DSP may be greater than T within the range of Inequality (2) and that the lens surface closest to the image side may be disposed at a position away from the aperture stop SP. Since light is sufficiently converged to decrease in diameter at a position away from the aperture stop SP to the image side, the aberrations can easily be corrected without affecting the spherical aberration and coma aberration. Furthermore, at a position away from the aperture stop SP to the image side, the distance between the on-axis light and the off-axis light passing therethrough is large in the direction perpendicular to the optical axis. This makes it easy to correct the astigmatism, the field curvature, and the distortion.

A decrease in DSP below the lower limit of Inequality (2) excessively decreases the distance from the aperture stop SP to the lens surface closest to the image side in the rear lens unit LR, reducing the effect of correcting the aberrations as described above.

An increase in DSP beyond the upper limit of Inequality (2) increases the effect of correction described above but makes it difficult to dispose the optical block FL, such as an infrared cut filter and a low-pass filter.

Inequality (3) defines the ratio of the absolute value of the focal length fL1 of the first partial unit L1 to the focal length fL2 of the positive second partial unit L2. Decreasing fL2 and increasing |fL1| within the range of Inequality (3) allows the optical system L0 to have smaller variations in optical performance due to manufacturing errors and to easily be manufactured while achieving a wide angle of view. Increasing |fL1| causes the on-axis light exiting from the first partial unit L1 to be substantially parallel (makes the first partial unit L1 nearly an afocal system).

This allows variations in spherical aberration to be reduced even if the distance between the first partial unit L1 and the second partial unit L2 changes because of manufacturing errors or the like, providing a high-performance optical system. This also allows the field curvature generated because of manufacturing errors of another lens to be corrected without affecting the spherical aberration by intentionally changing the distance between the first partial unit L1 and the second partial unit L2. The decrease in fL2 allows strong positive refractive power necessary for obtaining a wide angle of view.

A decrease in fL2 below the lower limit of Inequality (3) may be advantageous in increasing the angle of view but may make it difficult to correct the spherical aberration, field curvature, and barrel-shaped distortion that occur in the second partial unit L2.

An increase in fL2 beyond the upper limit of Inequality (3) may make it difficult to make the optical system L0 wide-angled. A decrease in |fL1| beyond the upper limit of Inequality (3) may increase variation in spherical aberration due to the manufacturing errors or the like described above.

Inequality (4) defines the ratio of the absolute value of the focal length fLF of the intermediate lens unit LF to the absolute value of the focal length fL1 of the first partial unit L1. Decreasing |fLF| in the range of Inequality (4) allows increasing the focus sensitivity of the intermediate lens unit LF (the ratio of the amount of movement of the image plane IP to the amount of movement of the intermediate lens unit LF). Increasing |fL1| in the range of Inequality (4) allows decreasing variations in spherical aberration due to manufacturing errors or the like.

A decrease in |fLF| below the lower limit of Inequality (4) may excessively increase the refractive power of the intermediate lens unit LF to increase variations in field curvature with focusing.

An increase in |fLF| beyond the upper limit of Inequality (4) may decrease the focus sensitivity of the intermediate lens unit LF to increase the amount of movement of the intermediate lens unit LF with focusing, resulting in an increase in the entire length of the optical system L0. A decrease in |fL1| beyond the upper limit of Inequality (4) may increase variations in spherical aberration due to manufacturing errors or the like.

Inequality (5) defines the ratio of the focal length fLP of the front lens unit LP to an ideal image height (a change in image height due to distortion is not involved) at a central projection. Decreasing fLP in the range of Inequality (5) allows the optical system L0 to be wide angled while correcting the spherical aberration, the field curvature, and distortion well.

A decrease in fLP below the lower limit of Inequality (5) may be advantageous in increasing the angle of view of the optical system L0 but may excessively increase the spherical aberration and the field curvature generated in the front lens unit LP in the downward direction.

An increase in fLP beyond the upper limit of Inequality (5) may make it difficult to increase the angle of view of the optical system L0.

Inequality (6) expresses the focus sensitivity of the intermediate lens unit LF. Decreasing the value (increasing the absolute value) within the range of Inequality (6) allows decreasing the amount of movement of the intermediate lens unit LF with focusing, thereby reducing the size of the optical system L0.

A decrease in the value below the lower limit of Inequality (6) allows the amount of movement of the intermediate lens unit LF with focusing to be decreased, thereby reducing the size of the optical system L0 but may excessively increase the refractive power of the intermediate lens unit LF, resulting in an increase in variations in aberration with focusing.

An increase in the value beyond the upper limit of Inequality (6) may excessively increase the amount of movement of the intermediate lens unit LF with focusing to increase the entire length of the optical system L0.

Inequality (7) defines the Abbe number vp of the lens Gp of the second partial unit L2. At least one positive lens of the second partial unit L2 satisfies Inequality (7). Increasing vp within the range of Inequality (7) allows the axial chromatic aberration to be decreased.

A decrease in vp below the lower limit of Inequality (7) may cause insufficient correction of the axial chromatic aberration on g-line.

An increase in vp beyond the upper limit of Inequality (7) may cause excessive correction of the axial chromatic aberration on g-line.

Inequality (8) defines the Abbe number vn of the lens Gn of the second partial unit L2. At least one negative lens of the second partial unit L2 satisfies Inequality (8). Decreasing vn within the range of Inequality (8) allows the axial chromatic aberration to be decreased.

A decrease in vn below the lower limit of Inequality (8) may cause excessive correction of the axial chromatic aberration on g-line.

An increase in vn beyond the upper limit of Inequality (8) may cause insufficient correction of the axial chromatic aberration on g-line.

Decreasing MF within the range of Inequality (9) allows the amount of movement of the intermediate lens unit LF with focusing to be reduced, thereby decreasing the entire length of the optical system L0. Increasing DSP within the range of Inequality (9) allows the surface closest to the image side to be disposed at a position away from the aperture stop SP, making it easy to correct aberrations (astigmatism, field curvature, and distortion) without affecting the spherical aberration and the coma aberration.

A decrease in MF below the lower limit of Inequality (9) may excessively increase the refractive power of the intermediate lens unit LF to increase variations in aberration with focusing. An increase in DSP below the lower limit of Inequality (9) may increase the entire length of the optical system L0.

An increase in MF beyond the upper limit of Inequality (9) may excessively increase the amount of movement of the intermediate lens unit LF with focusing to increase the entire length of the optical system L0. A decrease in DSP beyond the upper limit of Inequality (9) may decrease the effect of correcting the aberrations described above.

Inequality (10) defines the ratio of the focal length fLP of the front lens unit LP to the distance DSP from the aperture stop SP to the surface closest to the image side in the rear lens unit LR. Decreasing fLP within the range of Inequality (10) allows the optical system L0 to be wide-angled while correcting the spherical aberration, the field curvature, and the distortion well. Increasing DSP within the range of Inequality (10) may make it easy to correct the astigmatism, the field curvature, and the distortion, as described with reference to Inequality (9).

A decrease in fLP below the lower limit of Inequality (10) may be advantageous in increasing the angle of view of the optical system L0 but may excessively increase the spherical aberration and the field curvature that occur in the front lens unit LP in the downward direction. A decrease in DSP below the lower limit of Inequality (10) may increase the entire length of the optical system L0.

An increase in fLP beyond the upper limit of Inequality (10) may make it difficult to increase the angle of view of the optical system L0. A decrease in DSP beyond the upper limit of Inequality (10) may decrease the effect of correcting the astigmatism, the field curvature, and the distortion.

Inequality (11) defines the ratio of the focal length fL2 of the positive second partial unit L2 to the effective diameter EA of the surface closest to the image side in the rear lens unit LR.

A decrease in fLP below the lower limit of Inequality (11) may be advantageous in increasing the angle of view of the optical system L0 but may excessively increase the spherical aberration and the field curvature that occur in the front lens unit LP in the downward direction. An increase in EA below the lower limit of Inequality (11) may increase the size of the optical system L0 in the radial direction.

A decrease in fLP beyond the upper limit of Inequality (11) may make it difficult to increase the angle of view of the optical system L0. A decrease in EA beyond the upper limit of Inequality (11) may decrease the effect of correcting the field curvature and so on in the rear lens unit LR.

Inequality (12) defines the ratio of the focal length fLair of the biconvex air lens Lair of the first partial unit to the absolute value of the focal length fL1 of the first partial unit L1. An increase in fLair (a decrease in the absolute value of fLair) within the range of Inequality (12) allows the Petzval sum of the air lens Lair to be negative, which allows the positive Petzval sum of the entire optical system L0 to be corrected to nearly zero, thereby decreasing the field curvature.

A decrease in fLair below the lower limit of Inequality (12) may cause insufficient correction of the field curvature.

An increase in fLair beyond the upper limit of Inequality (12) may cause the air lens not to be biconvex, and cause the Petzval sum of the air lens to be positive, which makes it difficult to bring the Petzval sum of the entire optical system L0 nearly zero.

Inequality (13) defines the ratio of the maximum air space Dair of the biconvex air lens Lair of the first partial unit L1 to the distance L from the surface closest to the object side to the surface closest to the image side in the optical system L0.

A decrease in Dair below the lower limit of Inequality (13) may create the need for decreasing the curvatures of the object side surface and the image side surface of the air lens Lair, resulting in an excessive decrease in the negative refractive power of the air lens Lair to cause insufficient correction of the field curvature.

An increase in Dair beyond the upper limit of Inequality (13) may increase the entire length of the optical system L0.

Inequality (14) defines the ratio of the radius of curvature R of the surface closest to the object side of the single lens with negative refractive power that is concave on the object or the cemented lens with negative refractive power as a while included in the intermediate lens unit LF to the distance S from the aperture stop SP to the object side surface in focusing on an object at infinity. Setting the ratio within the range of Inequality (14) allows the off-axis light incident on the intermediate lens unit LF to enter the concave surface at a substantially right angle. The light indent on the surface at a substantially right angle is not greatly refracted by the surface. This may reduce variations in field curvature even if the intermediate lens unit LF moves with focusing.

If the ratio exceeds the lower limit or the upper limit of Inequality (14), off-axis light is incident on the concave surface at an angle tilted from the direction perpendicular to the concave surface and is greatly refracted, which may increase a variation in field curvature with focusing.

Inequality (15) defines the ratio of the focal length fLF of the intermediate lens unit LF to the focal length f of the optical system L0. Increasing fLF (decreasing the absolute value) within the range of Inequality (15) allows the amount of movement of the intermediate lens unit LF with focusing to be decreased to reduce the size of the optical system L0. This also allows off-axis light to be greatly thrown up by the intermediate lens unit LF onto the image plane IP, decreasing the entire length.

A decrease in fLF below the lower limit of Inequality (15) may increase the amount of movement of the intermediate lens unit LF with focusing to increase the entire length of the optical system L0.

An increase in fLF beyond the upper limit of Inequality (15) may excessively increase the refractive power of the intermediate lens unit LF to excessively increase variations in aberrations such as a field curvature with focusing.

Inequality (16) defines the ratio of the focal length fLRp of the single lens with positive refractive power of the rear lens unit LR to the absolute value of the focal length fL1 of the first partial unit L1. Decreasing fLRp within the range of Inequality (16) allows off-axis light to be refracted near the image plane IP, providing a sufficient telecentric property and allowing correction of astigmatism.

A decrease in fLRp below the lower limit of Inequality (16) may increase a barrel-shaped distortion.

An increase in fLRp beyond the upper limit of Inequality (16) may make it difficult to provide a sufficient telecentric property.

Preferably, at least one of the upper limit and the lower limit of each of the numerical ranges of Inequalities (2) to (16) is within the range of Inequalities (2a) to (16a), respectively.

$$0.25 < DSP/T < 0.90 \tag{2a}$$

$$0.01 < fL2/|fL1| < 0.70 \tag{3a}$$

$$0.01 < |fLF|/|fL1| < 1.40 \tag{4a}$$

$$0.40 < fLP/(f \times \tan \omega) < 1.40 \tag{5a}$$

$$-1.40 < (1-\beta LF^2) \times \beta LR^2 < -0.50 \tag{6a}$$

$$57 < vp < 115 \tag{7a}$$

$$15 < vn < 33 \tag{8a}$$

$$0.03 < MF/DSP < 0.13 \tag{9a}$$

$$0.25 < fLP/DSP < 0.70 \tag{10a}$$

$$0.40 < fL2/EA < 1.10 \tag{11a}$$

$$-0.45 < fLair/|fL1| < 0.05 \tag{12a}$$

$0.07 < Dair/L < 0.28$ (13a)

$-0.90 < S/R < -0.01$ (14a)

$-2.90 < fLF/f < -1.20$ (15a)

$0.00 < fLRp/|fL1| < 1.45$ (16a)

More preferably, at least one of the upper limit and the lower limit of the numerical ranges of Inequality (2) to (16) is within the range of Inequalities (2b) to (16b), respectively.

$0.40 < DSP/T < 0.89$ (2b)

$0.01 < fL2/|fL1| < 0.60$ (3b)

$0.01 < |fLF|/|fL1| < 1.25$ (4b)

$0.45 < fLP/(f \times \tan \omega) < 1.25$ (5b)

$-1.30 < (1-\beta LF^2) \times 13LR^2 < -0.60$ (6b)

$59 < \nu p < 110$ (7b)

$15 < \nu n < 32$ (8b)

$0.04 < MF/DSP < 0.12$ (9b)

$0.30 < fLP/DSP < 0.60$ (10b)

$0.50 < fL2/EA < 1.00$ (11b)

$-0.40 < fLair/|fL1| < 0.00$ (12b)

$0.09 < Dair/L < 0.26$ (13b)

$-0.80 < S/R < -0.02$ (14b)

$-2.80 < fLF/f < -1.40$ (15b)

$0.00 < fLRp/|fL| < 1.40$ (16b)

In addition, setting at least one of the upper limit and the lower limit of the numerical ranges of Inequalities (2) to (16) within Inequalities (2c) to (16c), respectively, may provide the maximum effects of the Inequalities (2c) to (16c).

$0.50 < DSP/T < 0.88$ (2c)

$0.02 < fL2/|fL1| < 0.50$ (3c)

$0.02 < |fLF|/|fL1| < 1.05$ (4c)

$0.55 < fLP/(f \times \tan \omega) < 1.00$ (5c)

$-1.20 < (1-\beta LF^2) \times \beta LR^2 < -0.65$ (6c)

$62 < \nu p < 100$ (7c)

$16 < \nu n < 31$ (8c)

$0.045 < MF/DSP < 0.10$ (9c)

$0.35 < fLP/DSP < 0.55$ (10c)

$0.55 < fL2/EA < 0.90$ (11c)

$-0.30 < fLair/|fL1| < -0.01$ (12c)

$0.11 < Dair/L < 0.22$ (13c)

$-0.60 < S/R < -0.03$ (14c)

$-2.70 < fLF/f < -1.60$ (15c)

$0.05 < fLRp/|fL| < 1.30$ (16c)

The optical systems L0 of the individual embodiments will be described.

In the first to seventh embodiments, the first partial unit L1 includes a cemented lens including a positive lens and a negative lens. This allows reducing variations in field curvature and one-side defocusing due to manufacturing errors in the first partial unit L1 while reducing the lateral chromatic aberration.

In the first to seventh embodiments, at least one positive lens of the second partial unit L2 has an aspherical shape. Since the second partial unit L2 needs strong positive refractive power to provide a wide angle of view, the aspherical shape of the positive lens facilitates correction of a spherical aberration and a coma aberration.

In the first to seventh embodiments, the intermediate lens unit LF consists of one negative lens or one cemented lens that is negative as a whole. Constituting the intermediate lens unit LF with a small number of lenses allows light weight of the lens unit and high-speed autofocusing (AF). The intermediate lens unit LF may include an additional lens element if high-speed AF is possible. At least one surface of the intermediate lens unit LF may have an aspherical shape to reduce variations in aberration with focusing.

In the first to seventh embodiments, the rear lens unit LR includes an aspherical positive lens. The aspherical surface of the positive lens may be effective in correcting an astigmatism.

In the sixth embodiment, the rear lens unit LR includes an aspherical negative lens G9. The aspherical surface includes an inflection point and a stationary point. The stationary point is a point that takes h such that the value of the first derivative of X(h) differentiated one by h is 0, where X is the amount of displacement from the vertex of the surface in the optical axis, h is the height from the optical axis in the direction perpendicular to the optical axis, and X(h) is the aspherical shape. Likewise, the inflection point is a point that takes h such that the value of the second derivative of X(h) differentiated twice by h is 0.

Including the inflection point and the stationary point allows the magnitude and the sign of the refractive power in the periphery of the lens surface to be changed independently from paraxial refractive power, facilitating correction of the astigmatism.

Numerical examples 1 to 7 corresponding to the first to seventh embodiments, respectively, are shown below.

In the surface data of each numerical example, r denotes the curvature radius of each optical surface, d (mm) denotes on-axis interval (the distance on the optical axis) between the m-th surface and the (m+1)th surface, where m is the number of a surface counted from the light incident side, nd denotes the refractive index of each optical member for d-line, and vd denotes the Abbe number of the optical member. The Abbe number vd of some material is expressed as:

$$\nu d = (Nd-1)/(NF-NC)$$

where Nd, NF, NC, and Ng are respective refractive indices of Fraunhofer lines for d-line (587.6 nm), F-line (486.1 nm), C-line (656.3 nm), and g-line (435.8 nm).

In the numerical examples, d, focal length (mm), F-number, and half angle of view (°) are values when the optical system L0 of each embodiment focuses on an object at infinity. Back focus BF is the distance from the final lens surface to the image plane IP expressed as a length in free space. The entire optical length is a value obtained by adding the back focus BF to the distance from the first lens surface to the final lens surface (not including the optical block FL corresponding to an optical filter, a face plate, a crystal low-pass filter, an infrared cut filter, or the like).

If the optical surface is an aspherical surface, sine * is put to the right of the surface number. The shape of the aspherical surface is expressed as, $$X=(h^2/R)/[1+\{1-(1+k)(h/R)^2\}^{1/2}]+A4\times h^4+A6\times h^6+A8\times h^8+A10\times h^{10}+A12\times h^{12}+\ldots$$

where x is the amount of displacement from the surface apex in the optical axis direction, h is the height from the optical axis in the direction perpendicular to the optical axis, R is the radius of paraxial curvature, k is conic constant, and A4, A6, A8, A10, Aa, are the aspherical coefficients of the individual orders. Sign "e±XX" in the individual aspherical coefficients indicates "×10±XX".

Numerical Example 1 in mm
Surface Data

| Surface number | r | d | nd | vd | Effective diameter |
|---|---|---|---|---|---|
| 1 | 6.878 | 0.35 | 1.83400 | 37.2 | |
| 2 | 3.173 | 2.74 | 1.51742 | 52.2 | |
| 3 | −7.178 | 0.35 | | | |
| 4 | 6.654 | 1.63 | 1.95375 | 32.3 | |
| 5 | −10.952 | 0.98 | | | |
| 6 (aperture) | ∞ | 0.87 | | | |
| 7* | 8.549 | 2.24 | 1.49710 | 81.6 | |
| 8* | −12.398 | 0.10 | | | |
| 9 | −10.934 | 0.35 | 1.80809 | 22.8 | |
| 10 | 9.261 | 0.26 | | | |
| 11* | 6.769 | 1.67 | 1.76802 | 49.2 | |
| 12* | −9.127 | (variable) | | | |
| 13 | −19.912 | 0.40 | 1.67300 | 38.3 | |
| 14 | 23.670 | (variable) | | | |
| 15* | 52.176 | 2.21 | 1.63560 | 23.9 | |
| 16* | −22.467 | 0.50 | | | 12.00 |
| 17 | ∞ | 0.50 | 1.51633 | 64.1 | |
| 18 | ∞ | 0.71 | | | |
| 19 | ∞ | 1.20 | 1.51633 | 64.1 | |
| 20 | ∞ | (variable) | | | |
| Image plane | ∞ | | | | |

Aspherical Surface Data

Seventh surface
K = 0.00000e+000 A4 = −2.55136e−003 A6 = 1.30530e−004 A8 = −9.41662e−005 A10 = 1.30876e−005 A12 = −1.81088e−006
Eighth surface
K = 0.00000e+000 A4 = −1.79707e−002 A6 = 2.61764e−003 A8 = −3.01330e−004 A10 = 1.86977e−005 A12 = −9.24451e−007
11th surface
K = 0.00000e+000 A4 = −9.15823e−003 A6 = 8.44821e−004 A8 = −3.46287e−005
12th surface
K = 0.00000e+000 A4 = 1.20425e−003 A6 = −3.58145e−004 A8 = 5.11906e−005 A10 = −2.11763e−006
15th surface
K = 0.00000e+000 A4 = 2.94889e−003 A6 = −3.11085e−004 A8 = 1.66513e−005 A10 = −4.63985e−007 A12 = 6.67079e−009 A14 = −3.98198e−011
16th surface
K = 0.00000e+000 A4 = 4.06056e−003 A6 = −3.37557e−004 A8 = 1.25655e−005 A10 = −2.13357e−007 A12 = 1.34436e−009

Various Data

| Focal length | 6.75 | |
|---|---|---|
| F-number | 2.88 | |
| Half angle of view (°) | 43.77 | |
| Image height | 6.47 | |
| Entire lens length | 21.56 | |
| BF | 3.07 | 3.07 |

| Focusing on an object at infinity | | Focusing on an object at close range (lateral magnification −0.1) |
|---|---|---|
| d12 | 2.05 | 2.86 |
| d14 | 2.29 | 1.48 |

-continued

| Lens Unit Data | | | |
|---|---|---|---|
| Unit | Starting surface | Focal length | Lens constitution length |
| 1 | 1 | −118.32 | 5.07 |
| 2 | 7 | 7.97 | 4.62 |
| 3 | 13 | −16.01 | 0.40 |
| 4 | 15 | 25.00 | 2.21 |
| 5 | 17 | ∞ | 1.71 |

| Single Lens Data | | |
|---|---|---|
| Lens | Starting surface | Focal length |
| 1 | 1 | −7.38 |
| 2 | 3 | −6.62 |
| 3 | 4 | 4.55 |
| 4 | 7 | 10.55 |
| 5 | 9 | −6.16 |
| 6 | 11 | 5.30 |
| 7 | 13 | −16.01 |
| 8 | 15 | 25.00 |
| 9 | 17 | 0.00 |
| 10 | 19 | 0.00 |

Numerical Example 2

| in mm Surface Data | | | | | |
|---|---|---|---|---|---|
| Surface number | r | d | nd | vd | Effective diameter |
| 1 | 55.072 | 0.40 | 1.59522 | 67.7 | |
| 2 | 3.851 | 2.66 | | | |
| 3 | −8.092 | 0.40 | 1.51823 | 58.9 | |
| 4 | 6.019 | 1.90 | 1.81600 | 46.6 | |
| 5 | −12.534 | 1.19 | | | |
| 6 (aperture) | ∞ | 1.00 | | | |
| 7 | 4.224 | 2.11 | 1.43700 | 95.1 | |
| 8 | 58.578 | 0.10 | | | |
| 9 | 6.033 | 1.47 | 1.49700 | 81.6 | |
| 10 | −29.754 | 0.40 | 1.75211 | 25.0 | |
| 11 | 8.536 | 0.82 | | | |
| 12* | 23.704 | 0.50 | 1.85135 | 40.1 | |
| 13* | 200.010 | (variable) | | | |
| 14 | −17.843 | 0.40 | 1.81600 | 46.6 | |
| 15 | 77.842 | (variable) | | | |
| 16* | 24.815 | 2.89 | 1.85135 | 40.1 | |
| 17 | −62.373 | 0.50 | | | 13.18 |
| 18 | ∞ | 0.59 | 1.51633 | 64.1 | |
| 19 | ∞ | 0.71 | | | |
| 20 | ∞ | 0.50 | 1.51633 | 64.1 | |
| 21 | ∞ | 1.20 | | | |
| Image plane | ∞ | | | | |

Aspherical Surface Data

12th surface
K = 0.00000e+000 A4 = −2.25054e−003 A6 = −7.60820e−004 A8 = −1.64662e−005
13th surface
K = 0.00000e+000 A4 = 1.38431e−003 A6 = −6.25380e−004 A8 = −1.06729e−005 A10 = 4.98781e−006
16th surface
K = 0.00000e+000 A4 = 2.93176e−004 A6 = −4.11486e−006 A8 = 8.39650e−008 A10 = −6.67871e−010

| Various Data | |
|---|---|
| Focal length | 7.72 |
| F-number | 2.88 |
| Half angle of view (°) | 39.61 |
| Image height | 6.39 |
| Entire lens length | 23.43 |
| BF | 3.13 |

-continued

| Focusing on an object at infinity | Focusing on an object at Close range (lateral magnification −0.1) |
|---|---|
| d13 | 1.40 | 2.44 |
| d15 | 2.65 | 1.61 |

Lens Unit Data

| Unit | Starting surface | Focal length | Lens constitution length |
|---|---|---|---|
| 1 | 1 | −17.94 | 5.36 |
| 2 | 7 | 8.21 | 5.40 |
| 3 | 14 | −17.76 | 0.40 |
| 4 | 16 | 21.17 | 2.89 |

Single Lens Data

| Lens | Starting surface | Focal length |
|---|---|---|
| 1 | 1 | −6.98 |
| 2 | 3 | −6.60 |
| 3 | 4 | 5.22 |
| 4 | 7 | 10.30 |
| 5 | 9 | 10.23 |
| 6 | 10 | −8.78 |
| 7 | 12 | 31.54 |
| 8 | 14 | −17.76 |
| 9 | 16 | 21.17 |
| 10 | 18 | 0.00 |
| 11 | 20 | 0.00 |

Numerical Example 3 in mm
Surface Data

| Surface number | r | d | nd | vd | Effective diameter |
|---|---|---|---|---|---|
| 1 | 7.089 | 0.40 | 1.80610 | 33.3 | |
| 2 | 3.222 | 2.80 | | | |
| 3 | −7.163 | 0.35 | 1.51742 | 52.2 | |
| 4 | 6.932 | 1.53 | 1.95375 | 32.3 | |
| 5 | −10.766 | 0.81 | | | |
| 6 (aperture) | ∞ | 0.96 | | | |
| 7* | 9.525 | 2.36 | 1.49710 | 81.6 | |
| 8* | −10.752 | 0.11 | | | |
| 9 | −10.304 | 0.35 | 1.80809 | 22.8 | |
| 10 | 10.304 | 0.28 | | | |
| 11* | 7.838 | 1.66 | 1.85135 | 40.1 | |
| 12* | −9.229 | (variable) | | | |
| 13 | −37.501 | 0.40 | 1.80809 | 22.8 | |
| 14 | 15.368 | (variable) | | | |
| 15* | 27.898 | 2.41 | 1.63550 | 23.9 | |
| 16* | −42.069 | 0.50 | | | 12.30 |
| 17 | ∞ | 0.50 | 1.51633 | 64.1 | |
| 18 | ∞ | 0.71 | | | |
| 19 | ∞ | 0.50 | 1.51633 | 64.1 | |
| 20 | ∞ | 1.20 | | | |
| Image plane | ∞ | | | | |

Aspherical Surface Data

Seventh surface
K = 0.00000e+000 A4 = −2.51395e−003 A6 = 2.21434e−004 A8 = −1.51537e−004 A10 = 2.79256e−005 A12 = −2.99479e−006
Eighth surface
K = 0.00000e+000 A4 = −1.50953e−002 A6 = 1.69573e−003 A8 = −1.22171e−004
11th surface
K = 0.00000e+000 A4 = −7.10328e−003 A6 = 5.30705e−004 A8 = −1.37005e−005 A10 = −3.50415e−007
12th surface
K = 0.00000e+000 A4 = 8.78035e−004 A6 = −2.63596e−004 A8 = 3.43946e−005 A10 = −1.28653e−006
15th surface
K = 0.00000e+000 A4 = 1.69451e−003 A6= −1.75727e−004 A8 = 9.58955e−006 A10 =

-continued

−2.69538e−007 A12 = 3.89994e−009 A14 = −2.32853e−011
16th surface
K = 0.00000e+000 A4 = 2.18456e−003 A6= −1.87718e−004 A8 = 6.93398e−006 A10 = −1.15675e−007 A12 = 7.18190e−010

| Various Data | |
|---|---|
| Focal length | 6.80 |
| F-number | 2.88 |
| Half angle of view (°) | 43.60 |
| Image Height | 6.47 |
| Entire lens length | 21.56 |
| BF | 3.07 |

| Focusing on an object at infinity | Focusing on an object at close range (lateral magnification −0.1) | |
|---|---|---|
| d12 | 1.81 | 2.47 |
| d14 | 2.24 | 1.59 |

| Lens Unit Data | | | |
|---|---|---|---|
| Unit | Starting surface | Focal length | Lens constitution length |
| 1 | 1 | −157.87 | 5.08 |
| 2 | 7 | 7.55 | 4.77 |
| 3 | 13 | −13.44 | 0.40 |
| 4 | 15 | 26.75 | 2.41 |

| Single Lens Data | | |
|---|---|---|
| Lens | Starting surface | Focal length |
| 1 | 1 | −7.68 |
| 2 | 3 | −6.75 |
| 3 | 4 | 4.62 |
| 4 | 7 | 10.57 |
| 5 | 9 | −6.33 |
| 6 | 11 | 5.21 |
| 7 | 13 | −13.44 |
| 8 | 15 | 26.75 |
| 9 | 17 | 0.00 |
| 10 | 19 | 0.00 |

Numerical Example 4

| in mm Surface Data | | | | | |
|---|---|---|---|---|---|
| Surface number | r | d | nd | vd | Effective diameter |
| 1 | 10.242 | 0.40 | 1.88300 | 40.8 | |
| 2 | 3.541 | 3.65 | | | |
| 3 | −13.689 | 0.35 | 1.49700 | 81.6 | |
| 4 | 6.727 | 1.82 | 1.95375 | 32.3 | |
| 5 | −21.979 | 0.80 | | | |
| 6 (aperture) | ∞ | 0.82 | | | |
| 7* | 6.613 | 2.38 | 1.59201 | 67.0 | |
| 8* | −5.869 | 0.10 | | | |
| 9 | −5.405 | 0.35 | 1.80809 | 22.8 | |
| 10 | 19.222 | 0.40 | | | |
| 11* | 10.211 | 1.08 | 1.85135 | 40.1 | |
| 12* | −15.940 | (variable) | | | |
| 13 | −16.670 | 0.40 | 1.63980 | 34.5 | |
| 14 | 15.775 | 1.10 | 1.49700 | 81.6 | |
| 15 | 34.716 | (variable) | | | |
| 16* | 38.126 | 1.91 | 1.67070 | 19.3 | |
| 17* | −22.882 | 0.50 | | | 11.06 |
| 18 | ∞ | 0.50 | 1.51633 | 64.1 | |
| 19 | ∞ | 0.71 | | | |
| 20 | ∞ | 0.50 | 1.51633 | 64.1 | |
| 21 | ∞ | 1.20 | | | |
| Image plane | ∞ | | | | |

-continued

Aspherical Surface Data

Seventh surface
K = 0.00000e+000 A4 = −7.20609e−004 A6 = 2.51245e−004 A8 = −1.65099e−004 A10 = 3.41574e−005 A12 = −3.88816e−006
Eighth surface
K = 0.00000e+000 A4 = −1.05929e−002 A6 = 1.69234e−003 A8 = −1.53149e−004
11th surface
K = 0.00000e+000 A4 = −8.68169e−003 A6 = 6.06804e−004 A8 = 3.27045e−005 A10 = −3.01469e−006
12th surface
K = 0.00000e+000 A4 = −1.27865e−003 A6 = −2.01475e−004 A8 = 7.66873e−005 A10 = −2.42045e−006
16th surface
K = 0.00000e+000 A4 = 1.48847e−003 A6 = −2.07594e−004 A8 = 1.30900e−005 A10 = −4.07412e−007 A12 = 6.30006e−009 A14 = −3.93673e−011
17th surface
K = 0.00000e+000 A4 = 2.87532e−003 A6 = −2.51549e−004 A8 = 1.12199e−005 A10 = −2.36244e−007 A12 = 1.86665e−009

Various Data

| | |
|---|---|
| Focal length | 6.30 |
| F-number | 2.88 |
| Half angle of view (°) | 45.76 |
| Image height | 6.47 |
| Entire lens length | 22.69 |
| BF | 3.07 |

| Focusing on an object at infinity | Focusing on an object at close range (lateral magnification −0.1) | |
|---|---|---|
| d12 | 2.09 | 2.87 |
| d15 | 1.98 | 1.19 |

Lens Unit Data

| Unit | Starting surface | Focal length | Lens constitution length |
|---|---|---|---|
| 1 | 1 | −31.62 | 6.23 |
| 2 | 7 | 7.93 | 4.30 |
| 3 | 13 | −16.01 | 1.50 |
| 4 | 16 | 21.59 | 1.91 |

Single Lens Data

| Lens | Starting surface | Focal length |
|---|---|---|
| 1 | 1 | −6.31 |
| 2 | 3 | −9.02 |
| 3 | 4 | 5.57 |
| 4 | 7 | 5.65 |
| 5 | 9 | −5.19 |
| 6 | 11 | 7.45 |
| 7 | 13 | −12.61 |
| 8 | 14 | 57.07 |
| 9 | 16 | 21.59 |
| 10 | 18 | 0.00 |
| 11 | 20 | 0.00 |

Numerical Example 5 in mm
Surface Data

| Surface number | r | d | nd | vd | Effective diameter |
|---|---|---|---|---|---|
| 1 | 7.472 | 0.40 | 1.49700 | 81.6 | |
| 2 | 3.164 | 3.39 | | | |
| 3 | −5.114 | 0.35 | 1.59551 | 39.2 | |
| 4 | 7.737 | 1.53 | 1.88300 | 40.8 | |
| 5 | −7.814 | 0.96 | | | |
| 6 (aperture) | ∞ | 1.02 | | | |
| 7* | 7.875 | 2.63 | 1.59201 | 67.0 | |
| 8* | −18.641 | 0.42 | | | |

-continued

| | | | | |
|---|---|---|---|---|
| 9 | −30.537 | 0.35 | 1.75211 | 25.0 |
| 10 | 8.499 | 1.27 | 1.85135 | 40.1 |
| 11* | −24.696 | (variable) | | |
| 12 | −52.424 | 0.40 | 1.86966 | 20.0 |
| 13 | 24.787 | (variable) | | |
| 14* | 35.850 | 2.17 | 1.63560 | 23.9 |
| 15* | −40.892 | 0.50 | | 11.95 |
| 16 | ∞ | 0.50 | 1.51633 | 64.1 |
| 17 | ∞ | 0.71 | | |
| 18 | ∞ | 0.50 | 1.51633 | 64.1 |
| 19 | ∞ | 1.20 | | |
| Image plane | ∞ | | | |

Aspherical Surface Data

Seventh surface
K = 0.00000e+000 A4 = −2.08566e−004 A6 = 3.53007e−006 A8 = −2.76678e−007
Eighth surface
K = 0.00000e+000 A4 = −2.16111e−003 A6 = 7.84238e−005 A8 = −8.06643e−007
11th surface
K = 0.00000e+000 A4 = 2.63801e−003 A6 = −1.92920e−005
14th surface
K = 0.00000e+000 A4 = 6.84700e−004 A6 = −1.65324e−005 A8 = 1.74589e−007
15th surface
K = 0.00000e+000 A4 = 5.07011e−004 A6 = −6.54251e−006 A8= −1.50520e−007 A10 = 3.05170e−009

Various Data

| | |
|---|---|
| Focal length | 7.56 |
| F-number | 2.88 |
| Half angle of view (°) | 40.57 |
| Image height | 6.47 |
| Entire lens length | 22.46 |
| BF | 3.07 |

| Focusing on an object at infinity | Focusing on an object at close range (lateral magnification −0.1) | |
|---|---|---|
| d11 | 1.70 | 2.75 |
| d13 | 2.79 | 1.74 |

Lens Unit Data

| Unit | Starting surface | Focal length | Lens constitution length |
|---|---|---|---|
| 1 | 1 | −51.04 | 5.68 |
| 2 | 7 | 8.48 | 4.67 |
| 3 | 12 | −19.31 | 0.40 |
| 4 | 14 | 30.39 | 2.17 |

Single Lens Data

| Lens | Starting surface | Focal length |
|---|---|---|
| 1 | 1 | −11.39 |
| 2 | 3 | −5.12 |
| 3 | 4 | 4.62 |
| 4 | 7 | 9.71 |
| 5 | 9 | −8.81 |
| 6 | 10 | 7.56 |
| 7 | 12 | −19.31 |
| 8 | 14 | 30.39 |
| 9 | 16 | 0.00 |
| 10 | 18 | 0.00 |

Numerical Example 6 in mm
Surface Data

| Surface number | r | d | nd | vd | Effective diameter |
|---|---|---|---|---|---|
| 1 | 8.240 | 0.40 | 1.51742 | 52.4 | |
| 2 | 3.506 | 3.66 | | | |

-continued

| | | | | |
|---|---|---|---|---|
| 3 | −7.157 | 0.35 | 1.51742 | 52.4 |
| 4 | 8.131 | 1.37 | 1.90043 | 37.4 |
| 5 | −10.178 | 0.80 | | |
| 6 (aperture) | ∞ | 0.80 | | |
| 7* | 12.736 | 2.80 | 1.59201 | 67.0 |
| 8* | −7.907 | 0.14 | | |
| 9 | −11.376 | 0.35 | 1.80809 | 22.8 |
| 10 | 11.376 | 0.57 | | |
| 11* | 14.397 | 1.37 | 1.85135 | 40.1 |
| 12* | −9.529 | (variable) | | |
| 13 | −34.193 | 0.40 | 1.96300 | 24.1 |
| 14 | 23.172 | (variable) | | |
| 15* | 45.086 | 2.29 | 1.67070 | 19.3 |
| 16* | −40.653 | 0.50 | | |
| 17* | 11.289 | 0.80 | 1.53160 | 55.8 |
| 18* | 7.387 | 0.60 | | 12.70 |
| 19 | ∞ | 0.50 | 1.51633 | 64.1 |
| 20 | ∞ | 1.20 | | |
| Image plane | ∞ | | | |

Aspherical Surface Data

Seventh surface
K = 0.00000e+000 A4 = −1.75746e−003 A6 = −4.64106e−006 A8 = −2.08667e−005
Eighth surface
K = 0.00000e+000 A4 = −5.39088e−003 A6 = 3.46820e−004 A8 = −2.18984e−005
11th surface
K = 0.00000e+000 A4 = −3.25242e−003
12th surface
K = 0.00000e+000 A4 = 7.18016e−005 A6= −1.64095e−004 A8 = 7.39502e−006 A10 = −2.03249e−007
15th surface
K = 0.00000e+000 A4 = 1.64948e−003 A6 = −1.11437e−004 A8 = 4.29921e−006 A10 = −9.36440e−008 A12 = 1.10782e−009 A14 = −5.68321e−012
16th surface
K = 0.00000e+000 A4 = 1.79573e−003 A6 = −1.15037e−004 A8 = 2.82313e−006 A10 = −2.42846e−008 A12 = 8.10346e−012
17th surface
K = 0.00000e+000 A4 = −4.54637e−003 A6 = 1.22575e−004 A8 = −1.07025e−006
18th surface
K = 0.00000e+000 A4 = −5.80361e−003 A6 = 1.52777e−004 A8 = −1.63066e−006

Various Data

| | |
|---|---|
| Focal length | 8.00 |
| F-number | 2.88 |
| Half angle of view (°) | 38.96 |
| Image height | 6.47 |
| Entire lens length | 22.83 |
| BF | 2.13 |

Focusing on an object at infinity  Focusing on an object at close range (lateral magnification −0.1)

| | | |
|---|---|---|
| d12 | 1.70 | 2.43 |
| d14 | 2.40 | 1.68 |

Lens Unit Data

| Unit | Starting surface | Focal length | Lens constitution length |
|---|---|---|---|
| 1 | 1 | 85.93 | 5.78 |
| 2 | 7 | 8.43 | 5.22 |
| 3 | 13 | −14.29 | 0.40 |
| 4 | 15 | 100.70 | 3.59 |

Single Lens Data

| Lens | Starting surface | Focal length |
|---|---|---|
| 1 | 1 | −12.14 |
| 2 | 3 | −7.30 |
| 3 | 4 | 5.20 |
| 4 | 7 | 8.68 |
| 5 | 9 | −6.99 |
| 6 | 11 | 6.92 |
| 7 | 13 | −14.29 |

-continued

| | | |
|---|---|---|
| 8 | 15 | 32.22 |
| 9 | 17 | −43.28 |
| 10 | 19 | 0.00 |

Numerical Example 7 in mm
Surface Data

| Surface number | r | d | nd | vd | Effective diameter |
|---|---|---|---|---|---|
| 1 | 14.048 | 0.95 | 1.90043 | 37.4 | |
| 2 | 18.980 | 0.36 | | | |
| 3 | 15.515 | 0.40 | 1.49700 | 81.6 | |
| 4 | 3.442 | 3.44 | | | |
| 5 | −7.034 | 0.35 | 1.63980 | 34.5 | |
| 6 | 9.868 | 1.78 | 1.88300 | 40.8 | |
| 7 | −8.501 | 0.80 | | | |
| 8 (aperture) | ∞ | 0.80 | | | |
| 9* | 9.932 | 3.16 | 1.55332 | 71.7 | |
| 10* | −11.300 | 0.55 | | | |
| 11 | −11.094 | 0.35 | 1.69895 | 30.1 | |
| 12 | 16.182 | 0.33 | | | |
| 13* | 10.346 | 1.84 | 1.76802 | 49.2 | |
| 14* | −13.304 | (variable) | | | |
| 15 | −169.196 | 0.40 | 1.95375 | 32.3 | |
| 16 | 20.160 | (variable) | | | |
| 17* | 28.135 | 2.70 | 1.53160 | 55.8 | |
| 18 | −135.241 | 0.50 | | | 12.95 |
| 19 | ∞ | 0.50 | 1.51633 | 64.1 | |
| 20 | ∞ | 0.71 | | | |
| 21 | ∞ | 0.50 | 1.51633 | 64.1 | |
| 22 | ∞ | 1.20 | | | |
| Image plane | ∞ | | | | |

Aspherical Surface Data

Ninth surface
K = 0.00000e+000 A4 = −1.28833e−003 A6 = 1.11092e−005 A8 = −1.34891e−005
10th surface
K = 0.00000e+000 A4 = −5.99816e−003 A6 = 3.16302e−004 A8 = −1.55071e−005
13th surface
K = 0.00000e+000 A4 = −3.63957e−003 A6 = 1.34216e−004 A8 = 1.35269e−006
14th surface
K = 0.00000e+000 A4 = 6.12152e−004 A6 = −4.63321e−005 A8 = 6.85976e−006 A10 = −3.34102e−008
17th surface
K = 0.00000e+000 A4 = 2.70834e−004 A6 = 6.68230e−007

Various Data

| | |
|---|---|
| Focal length | 8.15 |
| F-number | 2.88 |
| Half angle of view (°) | 39.62 |
| Image height | 6.75 |
| Entire lens length | 25.66 |
| BF | 3.07 |

| Focusing on an object at infinity | Focusing on an object at close range (lateral magnification −0.1) |
|---|---|
| d14 | 1.66 | 2.65 |
| d16 | 2.72 | 1.73 |

Lens Unit Data

| Unit | Starting surface | Focal length | Lens constitution length |
|---|---|---|---|
| 1 | 1 | −53.28 | 7.28 |
| 2 | 9 | 8.70 | 6.22 |
| 3 | 15 | −18.87 | 0.40 |
| 4 | 17 | 44.06 | 2.70 |

-continued

Single Lens Data

| Lens | Starting surface | Focal length |
|---|---|---|
| 1 | 1 | 55.00 |
| 2 | 3 | −9.00 |
| 3 | 5 | −6.37 |
| 4 | 6 | 5.42 |
| 5 | 9 | 10.09 |
| 6 | 11 | −9.37 |
| 7 | 13 | 7.84 |
| 8 | 15 | −18.87 |
| 9 | 17 | 44.06 |
| 10 | 19 | 0.00 |
| 11 | 21 | 0.00 |

The table below shows various values in the embodiments.

TABLE 1

| | | FIRST EMBODIMENT | SECOND EMBODIMENT | THIRD EMBODIMENT | FOURTH EMBODIMENT | FIFTH EMBODIMENT | SIXTH EMBODIMENT | SEVENTH EMBODIMENT |
|---|---|---|---|---|---|---|---|---|
| | f | 6.755 | 7.721 | 6.795 | 6.300 | 7.557 | 8.000 | 8.153 |
| | fL1 | −118.322 | −17.942 | −157.874 | −31.623 | −51.044 | 85.935 | −53.278 |
| | fL2 | 7.972 | 8.212 | 7.554 | 7.931 | 8.476 | 8.432 | 8.702 |
| | fLP | 5.362 | 6.628 | 5.105 | 5.101 | 6.146 | 5.796 | 6.357 |
| | fLF | −16.010 | −17.756 | −13.444 | −16.008 | −19.306 | −14.294 | −18.868 |
| | fLRp | 24.995 | 21.175 | 26.754 | 21.592 | 30.388 | 32.219 | 44.064 |
| | fLair | −2.585 | −4.082 | −2.681 | −3.138 | −2.979 | −3.862 | −3.565 |
| | ω(°) | 49.445 | 45.746 | 49.289 | 51.417 | 46.247 | 44.623 | 44.143 |
| | EA | 12.003 | 13.183 | 12.300 | 11.064 | 11.955 | 12.700 | 12.952 |
| | DSP | 12.435 | 13.747 | 12.603 | 12.595 | 12.753 | 14.118 | 14.508 |
| | T | 15.845 | 17.247 | 16.013 | 16.005 | 16.163 | 16.418 | 17.918 |
| | S | 7.535 | 7.804 | 7.544 | 7.205 | 7.393 | 7.721 | 8.685 |
| | R | −19.912 | −17.843 | −37.501 | −16.670 | −52.424 | −34.193 | −169.196 |
| | L | 18.490 | 20.300 | 18.490 | 19.622 | 19.390 | 20.700 | 22.590 |
| | Dair | 2.741 | 2.661 | 2.802 | 3.653 | 3.395 | 3.659 | 3.439 |
| | βLF | 1.463 | 1.485 | 1.563 | 1.474 | 1.404 | 1.528 | 1.430 |
| | βLR | 0.861 | 0.799 | 0.852 | 0.838 | 0.875 | 0.903 | 0.897 |
| | νp | 81.559 | 95.103 | 81.559 | 67.023 | 67.023 | 67.023 | 71.692 |
| | νn | 22.764 | 25.048 | 22.764 | 22.764 | 25.048 | 22.764 | 30.130 |
| | MF | 0.818 | 1.038 | 0.655 | 0.785 | 1.049 | 0.727 | 0.991 |
| Inequality (1) | fLP/EA | 0.447 | 0.503 | 0.415 | 0.461 | 0.514 | 0.456 | 0.491 |
| Inequality (2) | DSP/T | 0.785 | 0.797 | 0.787 | 0.787 | 0.789 | 0.860 | 0.810 |
| Inequality (3) | fL2/\|fL1\| | 0.067 | 0.458 | 0.048 | 0.251 | 0.166 | 0.098 | 0.163 |
| Inequality (4) | \|fLF\|/\|fL1\| | 0.135 | 0.990 | 0.085 | 0.506 | 0.378 | 0.166 | 0.354 |
| Inequality (5) | fLP/(f × tanω) | 0.679 | 0.836 | 0.647 | 0.646 | 0.779 | 0.734 | 0.803 |
| Inequality (6) | (1−βLF ^2) × βLR ^2 | −0.846 | −0.770 | −1.046 | −0.824 | −0.745 | −1.090 | −0.840 |
| Inequality (7) | νp | 81.559 | 95.103 | 81.559 | 67.023 | 67.023 | 67.023 | 71.692 |
| Inequality (8) | νn | 22.764 | 25.048 | 22.764 | 22.764 | 25.048 | 22.764 | 30.130 |
| Inequality (9) | MF/DSP | 0.066 | 0.076 | 0.052 | 0.062 | 0.082 | 0.052 | 0.068 |
| Inequality (10) | fLP/DSP | 0.431 | 0.482 | 0.405 | 0.405 | 0.482 | 0.411 | 0.438 |
| Inequality (11) | fL2/EA | 0.664 | 0.623 | 0.614 | 0.717 | 0.709 | 0.664 | 0.672 |
| Inequality (12) | fLair/\|fL1\| | −0.022 | −0.228 | −0.017 | −0.099 | −0.058 | −0.045 | −0.067 |
| Inequality (13) | Dair/L | 0.148 | 0.131 | 0.152 | 0.186 | 0.175 | 0.177 | 0.152 |
| Inequality (14) | S/R | −0.378 | −0.437 | −0.201 | −0.432 | −0.141 | −0.226 | −0.051 |
| Inequality (15) | fLF/f | −2.370 | −2.300 | −1.979 | −2.541 | −2.554 | −1.787 | −2.314 |
| Inequality (16) | fLRp/\|fL1\| | 0.211 | 1.180 | 0.169 | 0.683 | 0.595 | 0.375 | 0.827 |

Image Capturing Apparatus

Figure 15:
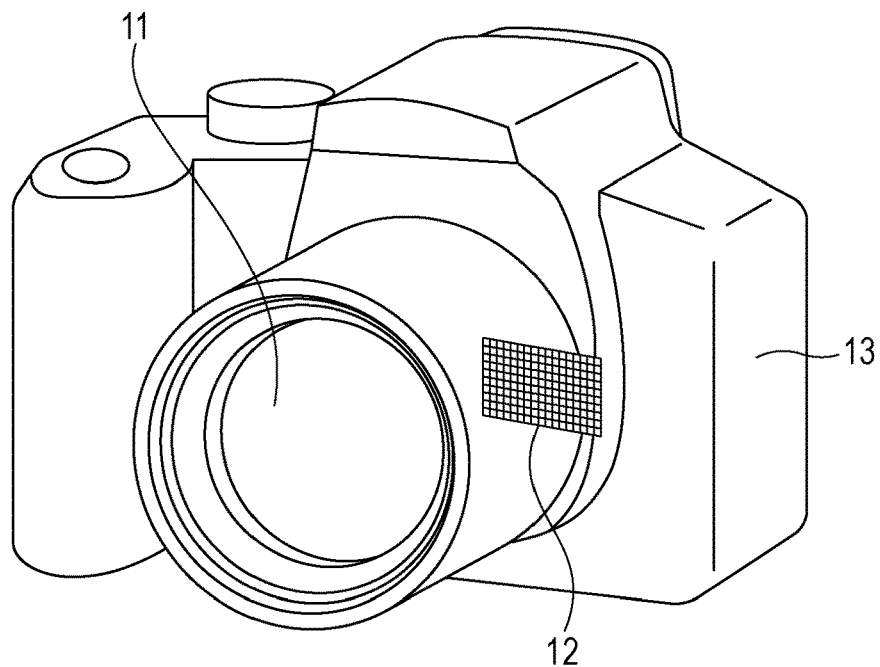
FIG. 15 is a schematic diagram illustrating an image capturing apparatus.

A digital still camera (image capturing apparatus) using the optical system L0 according to an embodiment of the present disclosure will be described with reference to FIG. 15. In FIG. 15, reference sign 10 denotes a camera body, and 11 denotes a lens apparatus including the optical system L0 described in one of the first to seventh embodiments.

Reference sign 12 denotes a solid-state image sensor (photoelectric conversion element), such as a CCD sensor or a CMOS sensor, which is housed in the camera body 10 and receives an optical image formed by the lens apparatus 11 and photoelectrically converts the image. The camera body 10 may be a what-is-called single-lens reflex camera including a quick turn mirror or a what-is-called mirrorless camera with no quick turn mirror.

Applying the optical system L0 according to an embodiment of the present disclosure to an image capturing apparatus, such as a digital still camera, provides a compact wide-angle image capturing apparatus with high optical performance in the periphery of the screen.

Lens Apparatus

Figure 16:
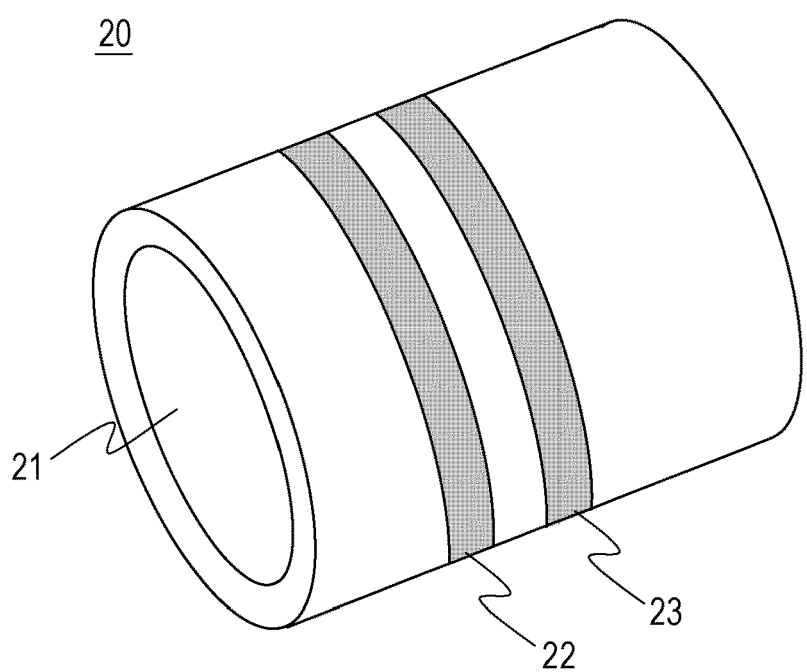
FIG. 16 is a schematic diagram illustrating a lens apparatus.

FIG. 16 is an external schematic view of a lens apparatus according to an embodiment of the present disclosure. The lens apparatus in FIG. 16 is a so-called interchangeable lens detachably attached to a camera body (not shown).

The lens apparatus 20 includes an imaging optical system 21 according to any one of the first to seventh embodiments described above. The lens apparatus 20 includes a focusing operation unit 22 and an operating unit 23 for changing the imaging mode.

When the user operates the focusing operation unit 22, the disposition of the intermediate lens unit LF in the imaging optical system 21 is mechanically or electrically changed to change the focal position.

The imaging optical system 21 may be operated by the user for a purpose other than focusing by operating the operating unit 23. For example, the aperture diameter of the aperture stop SP may be changed using the operating unit 23.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-154433, filed Sep. 22, 2021, which is hereby incorporated by reference herein in its entirety.

What is claimed is:

1. An optical system comprising, in order from an object side to an image side:
    a front lens unit with positive refractive power;
    an intermediate lens unit; and
    a rear lens unit,
    wherein the intermediate lens unit moves to change an interval between the front lens unit and the intermediate lens unit and an interval between the intermediate lens unit and the rear lens unit in focusing from infinity to a close range,
    wherein the front lens unit includes an aperture stop,
    wherein a first partial unit consisting of all lenses disposed on the object side of the aperture stop in the front lens unit includes a biconvex air lens, and
    wherein the following inequalities are satisfied:

$0.01 < fLP/EA < 0.80$, $0.40 < fL2/EA < 1.10$, and $0.11 < Dair/L < 0.22$ where fLP is a focal length of the front lens unit, EA is an effective diameter of a lens surface closest to the image side in the rear lens unit, fL2 is a focal length of a second partial unit consisting of all lenses disposed on the image side of the aperture stop in the front lens unit, Dair is a thickness of the biconvex air lens on an optical axis, and L is a distance from a lens surface closest to the image side to a lens surface closest to the object side in the optical system.

2. The optical system according to claim 1,
    wherein the front lens unit includes an aperture stop, and
    wherein the following inequality is satisfied:

$0.20 < DSP/T < 1.00$ where DSP is a distance from the aperture stop to the lens surface closest to the image side in the rear lens unit, and T is a distance from the aperture stop to an image plane.

3. The optical system according to claim 1,
    wherein the following inequality is satisfied:

$0.00 < fL2/|fL1| < 0.80$ where fL1 is a focal length of a first partial unit consisting of all lenses disposed on the object side of the aperture stop in the front lens unit, and fL2 is a focal length of a second partial unit consisting of all lenses disposed on the image side of the aperture stop in the front lens unit.

4. The optical system according to claim 1,
    wherein the following inequality is satisfied:

$0.00 < |fLF|/|fL1| < 1.50$ where fL1 is a focal length of a first partial unit consisting of all lenses disposed on the object side of the aperture stop in the front lens unit, and fLF is a focal length of the intermediate lens unit.

5. The optical system according to claim 1,
    wherein the following inequality is satisfied:

$-1.50 < (1-\beta LF^2) \times \beta LR^2 < -0.40$ where $\beta LF$ is a lateral magnification of the intermediate lens unit in focusing on an object at infinity, and $\beta LR$ is a lateral magnification of the rear lens unit in focusing on an object at infinity.

6. The optical system according to claim 1,
    wherein a second partial unit consisting of all lenses disposed on the image side of the aperture stop in the front lens unit includes a lens Gp with positive refractive power and a lens Gn with negative refractive power, and
    wherein the following inequalities are satisfied:

$55 < \nu p < 120$ and $15 < \nu n < 35$ where $\nu p$ is an Abbe number of the lens Gp, and $\nu n$ is an Abbe number of the lens Gn.

7. The optical system according to claim 1,
    wherein the following inequality is satisfied:

$0.02 < MF/DSP < 0.15$ where DSP is a distance from the aperture stop to the lens surface closest to the image side in the rear lens unit, and MF is an amount of movement of the intermediate lens unit after focusing on an object at infinity until focusing on a position where a lateral magnification of the optical system is −0.1.

8. The optical system according to claim 1,
    wherein the following inequality is satisfied:

$0.20 < fLP/DSP < 0.80$ where DSP is a distance from the aperture stop to the lens surface closest to the image side in the rear lens unit.

9. The optical system according to claim 1,
    wherein the following inequality is satisfied:

$-0.50 < fLair/|fL1| < 0.00$ where fLair is a focal length of the biconvex air lens, and fL1 is a focal length of the first partial unit.

10. The optical system according to claim 1,
    wherein the intermediate lens unit includes a single lens that has negative refractive power and that is concave on the object side, or a cemented lens having negative refractive power as a whole, and
    wherein the following inequality is satisfied:

$-1.00 < S/R < 0.00$ where R is a radius of curvature of a lens surface closest to the object side of the single lens or the cemented lens included in the intermediate lens unit, and S is a distance from the aperture stop to the lens surface closest to the object side of the single lens or the cemented lens included in the intermediate lens unit in focusing on an object at infinity.

11. The optical system according to claim 1, wherein the following inequality is satisfied:

$$-3.00 < fLF/f < -1.00$$

where fLF is a focal length of the intermediate lens unit, and f is a focal length of the optical system.

12. The optical system according to claim 1, wherein the rear lens unit includes a single lens with positive refractive power, and
wherein the following inequality is satisfied:

$$0.00 < fLRp/|fL1| < 1.50$$

where fL1 is a focal length of a first partial unit consisting of all lenses disposed on the object side of the aperture stop in the front lens unit, and fLRp is a focal length of the single lens of the rear lens unit.

13. The optical system according to claim 1, wherein a first partial unit consisting of all lenses disposed on the object side of the aperture stop in the front lens unit includes three lenses of a meniscus lens with negative refractive power, a lens with negative refractive power, and a lens with positive refractive power in order from the object side.

14. The optical system according to claim 1, wherein a second partial unit consisting of all lenses disposed on the image side of the aperture stop in the front lens unit includes at least two lenses with positive refractive power and at least one lens with negative refractive power.

15. The optical system according to claim 1, wherein the intermediate lens unit has negative refractive power, and
wherein the rear lens unit has positive refractive power.

16. An image capturing apparatus comprising:
the optical system according to claim 1; and
an image sensor that receives light of an image formed by the optical system.

17. The image capturing apparatus according to claim 16, wherein the following inequality is satisfied:

$$0.30 < fLP/(f \times \tan \omega) < 1.50$$

where f is a focal length of the optical system, and $\omega$ is a half angle of view of the optical system.

* * * * *